United States Patent
Christmas et al.

(10) Patent No.: US 12,078,801 B2
(45) Date of Patent: Sep. 3, 2024

(54) IMAGE PROJECTION

(71) Applicant: ENVISICS LTD, Milton Keynes (GB)

(72) Inventors: Jamieson Christmas, Milton Keynes (GB); Máté Karner, Milton Keynes (GB); Ruisheng Lin, Milton Keynes (GB); Timothy Smeeton, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 179 days.

(21) Appl. No.: 17/587,327

(22) Filed: Jan. 28, 2022

(65) Prior Publication Data

US 2022/0252879 A1 Aug. 11, 2022

(30) Foreign Application Priority Data

Feb. 5, 2021 (GB) .................................. 2101666

(51) Int. Cl.
*G03H 1/08* (2006.01)
*G02B 27/00* (2006.01)
(Continued)

(52) U.S. Cl.
CPC ..... *G02B 27/0103* (2013.01); *G02B 27/0081* (2013.01); *G03H 1/0808* (2013.01);
(Continued)

(58) Field of Classification Search
CPC ........... G02B 27/0103; G02B 27/0081; G02B 2027/0105; G03H 1/0808; G03H 1/16; G03H 1/2294
(Continued)

(56) References Cited

U.S. PATENT DOCUMENTS 8,218,211 B2 * 7/2012 Kroll ....................... G03H 1/02
359/9
2010/0149313 A1 6/2010 Kroll
(Continued)

FOREIGN PATENT DOCUMENTS

| GB | 2498170 A | 7/2013 |
|---|---|---|
| GB | 2501112 A | 10/2013 |
| JP | 2013054141 A | 2/2016 |

*Primary Examiner* — Audrey Y Chang
(74) *Attorney, Agent, or Firm* — McDonnell Boehnen Hulbert & Berghoff LLP

(57) ABSTRACT

Display system and methods including a display device arranged to display a hologram and spatially modulate light and a hologram engine arranged to receive contribution information identifying contributory and non-contributory areas of the display device based on the location of an entrance pupil. The contributory areas of the display device propagate light passing through the entrance pupil at the determined location. The non-contributory areas of the display device propagate light stopped by the entrance pupil at the determined location. The contribution information identifies (i) at least one primary contributory area of the display device that contributes to a primary image and (ii) at least one secondary contributory area of the display device that contributes to a secondary image. The hologram engine is arranged to determine a hologram based on the at least one primary contributory area of the display device identified by the processing engine.

17 Claims, 25 Drawing Sheets

(51) Int. Cl.
    *G02B 27/01* (2006.01)
    *G03H 1/16* (2006.01)
    *G03H 1/22* (2006.01)
(52) U.S. Cl.
    CPC ............ *G03H 1/16* (2013.01); *G03H 1/2294* (2013.01); *G02B 2027/0105* (2013.01)
(58) Field of Classification Search
    USPC .......................................................... 359/9
    See application file for complete search history.

(56) References Cited

U.S. PATENT DOCUMENTS

| | | | |
|---|---|---|---|
| 2012/0224062 A1* | 9/2012 | Lacoste | G09G 5/14 348/148 |
| 2016/0357016 A1 | 12/2016 | Cakmakci | |
| 2019/0086674 A1 | 3/2019 | Sinay et al. | |
| 2019/0369403 A1 | 12/2019 | Leister | |

* cited by examiner

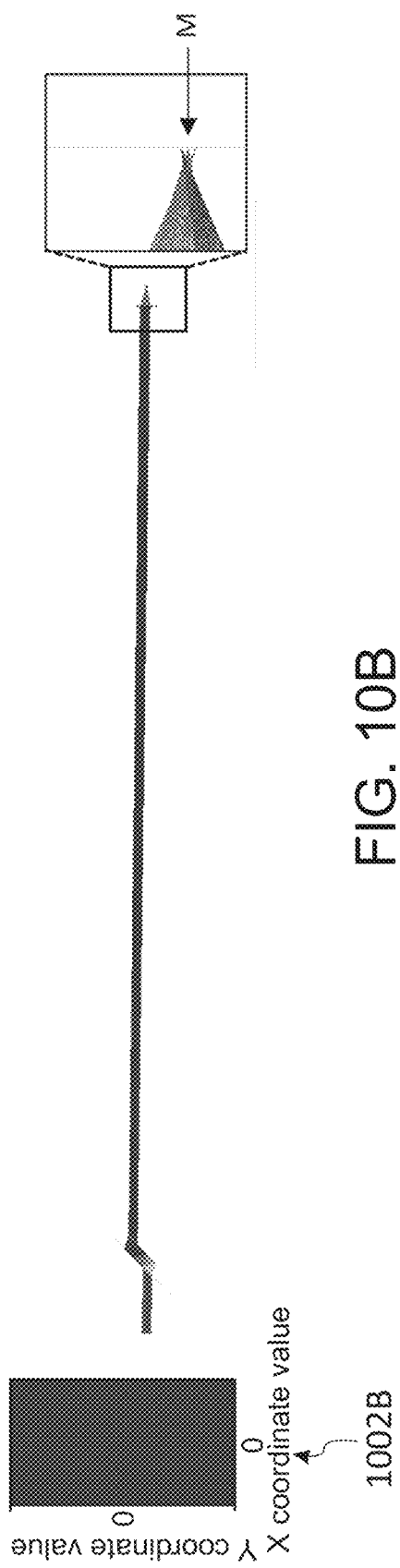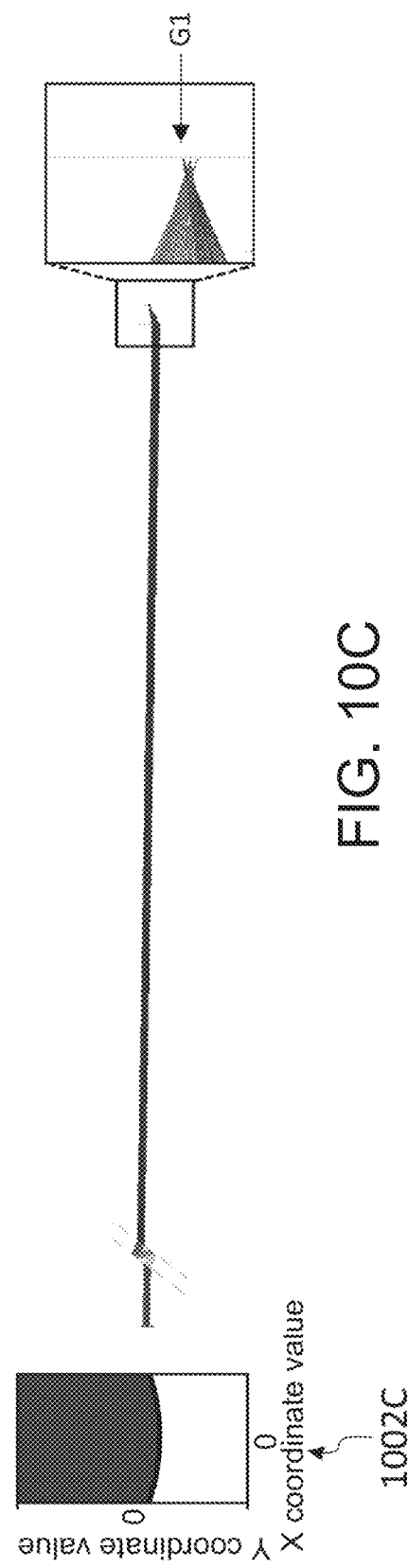

IMAGE PROJECTION

CROSS-REFERENCE TO RELATED APPLICATIONS

The present application is a non-provisional patent application claiming priority to United Kingdom Patent Application No. GB 2101666.2, filed Feb. 5, 2021, the contents of which are hereby incorporated by reference in their entirety.

FIELD OF THE DISCLOSURE

The present disclosure relates to image projection. More specifically, the present disclosure relates to holographic projection and a method for determining a diffractive structure such as a hologram or kinoform. Some embodiments relate to real-time hologram calculation based on eye-tracking information. Some embodiments relate to virtual image projection. Other embodiments relate to projection of a real image. Embodiments relate to viewing a projected image through a waveguide. Some embodiments relate to a light engine such as a picture generating unit. Some embodiments relate to a head-up display.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LIDAR", for example.

SUMMARY

Aspects of the present disclosure are defined in the appended independent claims.

The present disclosure relates to image projection. It relates to a method of image projection and an image projector which comprises a display device. The present disclosure also relates to a projection system comprising the image projector and a viewing system. The present disclosure is equally applicable to a monocular and binocular viewing system. The viewing system may comprise a viewer's eye or eyes. The viewing system comprises an optical element having optical power (e.g. lens/es of the human eye) and a viewing plane (e.g. retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. The image is formed by illuminating a diffractive pattern (e.g. hologram) displayed on the display device.

The display device comprises pixels. The pixels of the display device diffract light. In accordance with well-understood optics, the magnitude of the maximum diffraction angle is determined by the size of the pixels (and other factors such as the wavelength of the light).

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In embodiments, the image is a real image. In other embodiments, the image is a virtual image that is perceived by a human eye (or eyes). The projection system, or light engine, may thus be configured so that the viewer looks directly at the display device. In such embodiments, light encoded with the hologram is propagated directly to the eye(s) and there is no intermediate holographic reconstruction formed, either in free space or on a screen or other light receiving surface, between the display device and the viewer. In such embodiments, the pupil of the eye may be regarded as being the entrance aperture of the viewing system and the retina of the eye may be regarded as the viewing plane of the viewing system. It is sometimes said that, in this configuration, the lens of the eye performs a hologram-to-image conversion.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g. from any one eye position within a viewing window such as eye-motion box.)

In some embodiments, the image perceived by a viewer is a virtual image that appears upstream of the display device—that is, the viewer perceives the image as being further away from them than the display device. Conceptually, it is possible to consider a plurality of different virtual image points of a virtual image. The distance from a virtual point to the viewer is referred to herein as a virtual image distance, for that virtual image point. Different virtual points may, of course, have different virtual image distances. Individual light rays, within ray bundles associated with each virtual point, may take different respective optical paths to the viewer, via the display device. However, only some parts of the display device, and therefore only some of the rays from one or more virtual points of a virtual image, may be within the user's field of view. In other words, only some of the light rays from some of the virtual points on the virtual image will propagate, via the display device, into the user's eye(s) and thus will be visible to the viewer. Conceptually, it may therefore be considered that the viewer is looking at a virtual image through an 'display device-sized window', which may be very small, for example 1 cm in diameter, at a relatively large distance, e.g. 1 metre. And the user will be viewing the display device-sized window via the pupil(s) of their eye(s), which can also be very small. Accordingly, the field of view becomes small and the specific angular range that can be seen depends heavily on the eye position, at any given time.

The present disclosure addresses a technical problem of how to increase the field of view—i.e., how to increase the range of angles of light rays that are propagated from the display device, and which can successfully propagate through an eye's pupil to form an image—when the display device is (in relative terms) small, and the projection distance is (in relative terms) large. In some embodiments, the projection distance is at least one—such as, at least two—orders of magnitude greater than the diameter, or width, of the aperture of the display device (i.e., size of the array of pixels). More specifically, the present disclosure addresses a technical problem of how to do this with so-called direct view holography in which a hologram of an image is propagated to the human eye, rather than the image itself being propagated to the human eye. In other words, the light received by the viewer is modulated according to a hologram of the image.

A waveguide is used to expand the field of view and therefore to increase the maximum propagation distance over which the full diffractive angle of the display device may be used. Use of a waveguide can also increase the user's eye-box laterally, thus enabling some movement of the eye(s) to occur, whilst still enabling the user to see the image. The waveguide may therefore be referred to as a waveguide pupil expander. The present inventors, however, have found that for a non-infinite virtual image distance—that is, near-field virtual images—so-called 'ghost images' appear owing to the different possible light propagation paths through the waveguide. A ghost image is a lower intensity replica of a main image. The main, highest intensity image may be referred to as the primary image. Each ghost image may be referred to as a secondary image. The presence of ghost images can significantly reduce the quality of a perceived virtual image. The ghost images may give the appearance of blurring of the primary image.

The present disclosure relates to different approaches for addressing problems caused by the ghost images. Some solutions disclosed herein have been shown to successfully remove the ghost images. Some solutions disclosed herein have been shown to modify/manipulate the ghost image(s) in order to enhance or reinforce the primary/non-ghost image.

According to an aspect, a light engine is arranged to provide a viewing system, having an entrance pupil, with spatially modulated light. The display system comprises a display device arranged to display a hologram and spatially modulate light in accordance with the hologram. The display system further comprises a hologram engine arranged to receive contribution information identifying contributory and non-contributory areas of the display device based on the location of the entrance pupil. The contributory areas of the display device substantially propagate light passing through the entrance pupil at the determined location. The non-contributory areas of the display device substantially propagate light stopped by the entrance pupil at the determined location. The hologram engine is further arranged to determine a hologram based on the at least one primary contributory area of the display device identified by the processing engine. The hologram engine is further arranged to output the hologram to the display device for display.

In at least some embodiments, the contribution information further identifies (i) at least one primary contributory area of the display device propagating light to the viewing system that contributes to a primary image and (ii) at least one secondary contributory area of the display device propagating light to the viewing system that contributes to a secondary image.

For the avoidance of doubt, the image formed or perceived is a holographic reconstruction of a target image. The holographic reconstruction is formed from a hologram based on the target image. In some embodiments, the hologram is determined (e.g. calculated) from the target image.

By identifying contributory and non-contributory areas of the display device, the light engine can determine which part or parts of the display device can usefully be encoded by the hologram, in order to contribute positively to formation of the primary image, for a given location of the entrance aperture of the viewing system. For example, this may correspond to a location of a viewer's eye, at a given time. Moreover, the light engine can determine which parts of the display device cannot propagate light through the entrance aperture, and thus are not worth populating with hologram values. In addition, the light engine may distinguish between parts of the display device that contribute positively to a 'main' target image and parts which contribute to a copy/replica or 'ghost' version of the primary image. The hologram can thus be omitted in so-called secondary contributory areas, to eliminate the ghosts.

Alternatively, in a notable further improvement, the hologram displayed in an additional contributory area may be determined, based on a displaced or amended location of an image point (i.e., of a point within a desired image, that is to be holographically reconstructed). This amended location may be referred to as being a 'secondary image point' but this is shorthand for it being a secondary (i.e., changed) location of the (primary) image point. In brief, a modelled/computed location of an image point may be amended (e.g., translated on an image plane) so that light travelling from said amended location, via the additional contributory area on the display device, would arrive at a desired location on a viewing plane, in order to effectively reinforce the primary image. Therefore, in this alternative approach, the hologram for the additional contributory area is determined based on a different location of the image point to that which is used to identify a primary contributory area on the display device. The optical path length, from the primary image point, is typically different to the optical path length, from the secondary image point, to the corresponding image that is formed on the viewing plane. It may thus be said that the hologram determination process in relation to the additional contributory area comprises translating or shifting the image point used in the hologram determination process.

Thus, an intelligent and efficient light engine is provided, which can be configured and operate to provide sharp, accurate images, corresponding to holograms that have been determined in a streamlined and computationally efficient manner.

According to an aspect, a method is provided of determining a hologram for display on a display device. The method comprises determining the location of the entrance pupil of a viewing system arranged to view the hologram and identifying contributory areas and non-contributory areas of the display device, wherein the contributory areas of the display device substantially propagate light passing through the entrance pupil of the viewing system at the determined location and non-contributory areas of the display device substantially propagate light stopped by the entrance pupil of the viewing system at the determined location. The method further comprises determining the hologram based on the at least one primary contributory area of the display device.

The method may further comprise identifying at least one primary contributory area of the display device that provides light contributing to a primary image and at least one secondary contributory area of the display device that provides light contributing to a secondary image.

According to an aspect, a diffractive structure is provided, arranged to spatially modulate light transformable by a viewing system into a target image, wherein the diffractive structure is configured to generate a plurality of discrete light patterns, each light pattern corresponding to a different part of the target image, wherein the shape of each discrete light pattern substantially corresponds to the shape of an entrance aperture of the viewing system.

According to an aspect, a diffractive structure is provided, arranged to spatially modulate light transformable by a viewing system (comprising a lens) into an image, wherein the diffractive structure is arranged to direct light into a plurality of discrete light channels, wherein each light channel has a cross-sectional shape substantially corresponding to an entrance pupil of the viewing system and each light channel substantially corresponds to a different part of the image.

According to an aspect, a method is provided of determining a hologram for display on a display device and formation of a virtual image perceivable from a viewing plane by viewing a hologram displayed on the display device through a waveguide. The method comprises, for each virtual image point of the virtual image, determining the coordinates of the virtual image point, $[x_{virtual}, y_{virtual}, z_{virtual}]$, determining a viewing position on the viewing plane, and determining a number of light reflections, B, within the waveguide associated with a primary image formed by the waveguide. The method further comprises ray tracing from the virtual image point to the viewing plane for 'B' light reflections within the waveguide and determining coordinates, $[x_{LCOS}(B), y_{LCOS}(B)]$, of a chief light ray at the display device for light propagation from $[x_{virtual}, y_{virtual}, z_{virtual}]$ to the viewing plane with B reflections. The method further comprises determining active pixels of display device within an area defined by $[x_{LCOS}(B), y_{LCOS}(B)]$; and determining a sub-hologram comprising an amplitude and/or phase hologram component for the active pixels by propagating a light wave from $[x_{virtual}, y_{virtual}, z_{virtual}]$ to the active pixels.

The chief ray may comprise a light ray that is determined (e.g, computed or modelled) as travelling from the virtual image point, via the display device, to a primary or 'main' image point, of the virtual image point, on the viewing plane.

The method may further comprise combining the sub-holograms—calculated respectively for two or more corresponding virtual image points—in order to form a hologram.

The method may further comprise determining a position on the viewing plane, $[x_{sensor}, y_{sensor}]$, of the main image of the virtual image point.

The method may further comprise, for each value of $\Delta B$ permitted by the waveguide, ray tracing back from $[x_{sensor}, y_{sensor}]$ to a virtual image plane zvirtual for B+$\Delta B$ bounces and determining virtual point coordinates, $[x_{virtual}(\Delta B), y_{virtual}(\Delta B), z_{virtual}]$, that will image to $[x_{sensor}, y_{sensor}]$ for B+$\Delta B$ reflections. The method may further comprise determining the coordinates, $[x_{LCOS}(B+\Delta B), y_{LCOS}(B+\Delta B)]$, of a chief ray at the display device for light propagation from $[x_{virtual}(\Delta B), y_{virtual}(\Delta B), z_{virtual}]$ to the viewing plane with B+$\Delta B$ bounces and identifying additional active pixels of the display device within a second area (i.e., an additional area) that is defined by $[x_{LCOS}(B+\Delta B), y_{LCOS}(B+\Delta B)]$. The method may further comprise determining an additional sub-hologram comprising an amplitude and/or phase hologram component for the additional active pixels by propagating a light wave from $[x_{virtual}(\Delta B), y_{virtual}(\Delta B), z_{virtual}]$ to the additional active pixels.

Aspects of the present disclosure also relate to a hologram or kinoform characterised by the channelling or routing of holographic light. Specifically, there is disclosed herein a diffractive structure arranged to spatially modulate light transformable by a viewing system into an image, wherein the diffractive structure is configured to route light into a plurality of hologram channels, each hologram channel corresponding to a different part of the image.

The diffractive structure may be arranged such that the hologram channels propagate from the diffractive structure at different angles.

Each hologram channel may comprise spatially modulated light in accordance with a hologram of the respective different part of the image.

The diffractive structure may be arranged to spatially modulate the phase of light.

The diffractive structure may be arranged to route light through a waveguide. The waveguide may be arranged for pupil expansion.

The cross-sectional shape of the light pattern formable by each hologram channel may substantially corresponds to the shape of an entrance aperture of the viewing system.

The hologram channels may be spatially separated or at least partially spatially separated.

There is further disclosed herein a system comprising the diffractive structure, a waveguide arranged to receive the spatially modulated light from the diffractive structure and a viewing system arranged to receive the spatially modulated light via the waveguide.

The system may be arranged such that light of each hologram channel follows a different optical path from the diffractive structure to the viewing system.

The different optical paths may comprise a different number of reflections within the waveguide. The different optical paths may have different lengths. The different optical paths may pass through the entrance aperture of the viewing system at a different angle.

The waveguide may be arranged so that all hologram channels are routed through the entrance aperture of the viewing system at any viewing position on a viewing plane. The waveguide only routes each hologram channel via one optical path to the viewing system for each permitted viewing position.

At least two hologram channels of the plurality of hologram channels may be partially overlapping at the entrance aperture of the viewing system.

The diffractive structure may be a kinoform or hologram.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction may be a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality of diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the original object (i.e. target image for reconstruction). Such a holographic recording may be referred to as a phase-only hologram. Embodiments relate to a phase-only hologram but the present disclosure is equally applicable to amplitude-only holography. The present disclosure is not limited to any particular method of hologram calculation. Some embodiments relate to point cloud holograms—that is, holograms built up using point cloud methods—by way of example only. However, the present disclosure is equally applicable to Fourier or Fresnel-type holograms and holograms calculated according to other techniques such as coherent ray tracing.

The present disclosure is also equally applicable to forming a holographic reconstruction using amplitude and phase information related to the original object (i.e. target image). In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2n$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE FIGURES

Specific embodiments are described by way of example only with reference to the following figures:

FIG. 6B shows a magnified view of the optical paths of FIG. 6a;

FIGS. 10A to 10C shows first, second and third propagation paths through a waveguide giving rise to a second ghost point, main image point and first ghost point, respectively;

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship within the scope of the appended claims.

Optical Configuration

Figure 1:
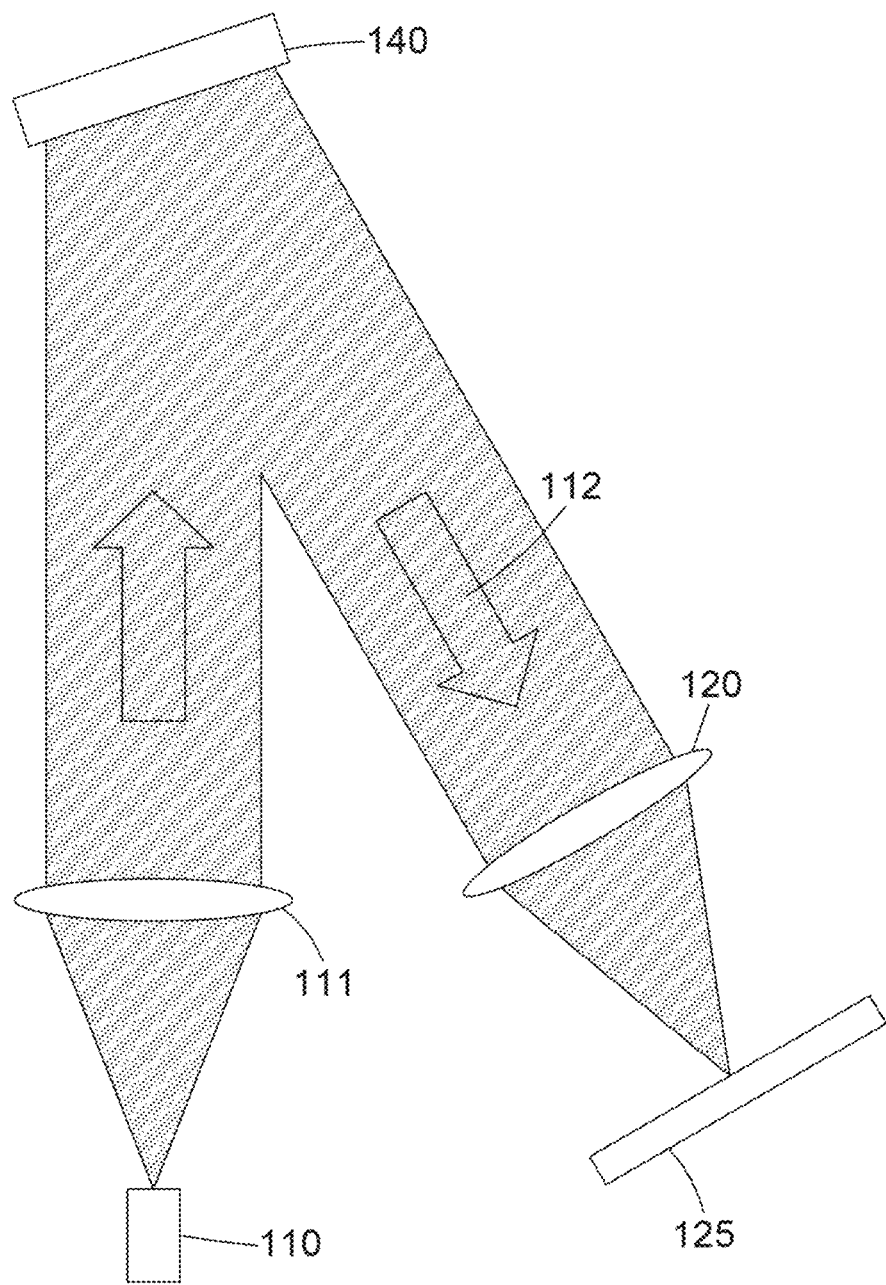
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It will be appreciated that this is merely an example, and that other methods for computer-generating the hologram are contemplated in the present disclosure. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in United Kingdom Patent nos. 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
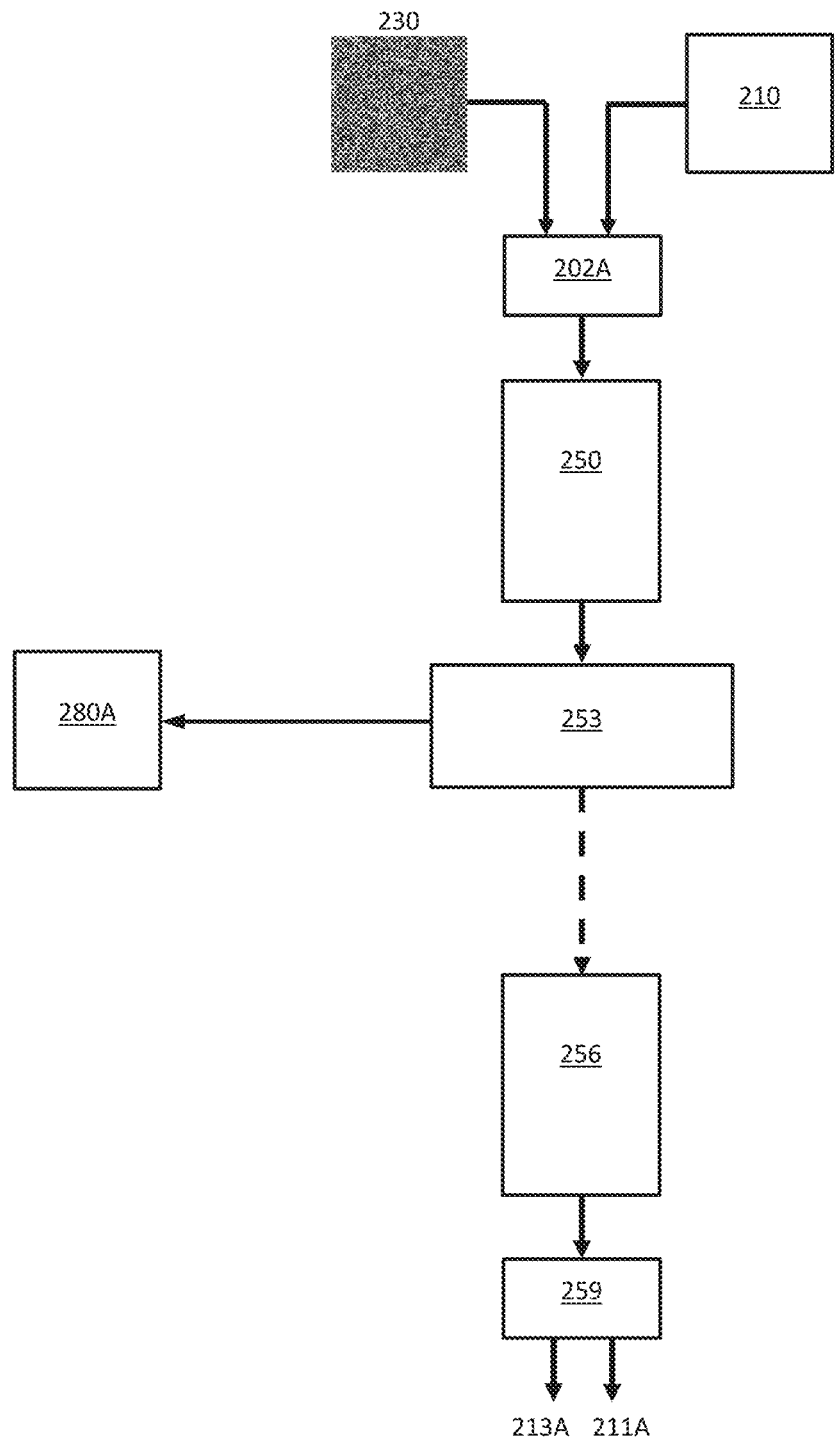
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
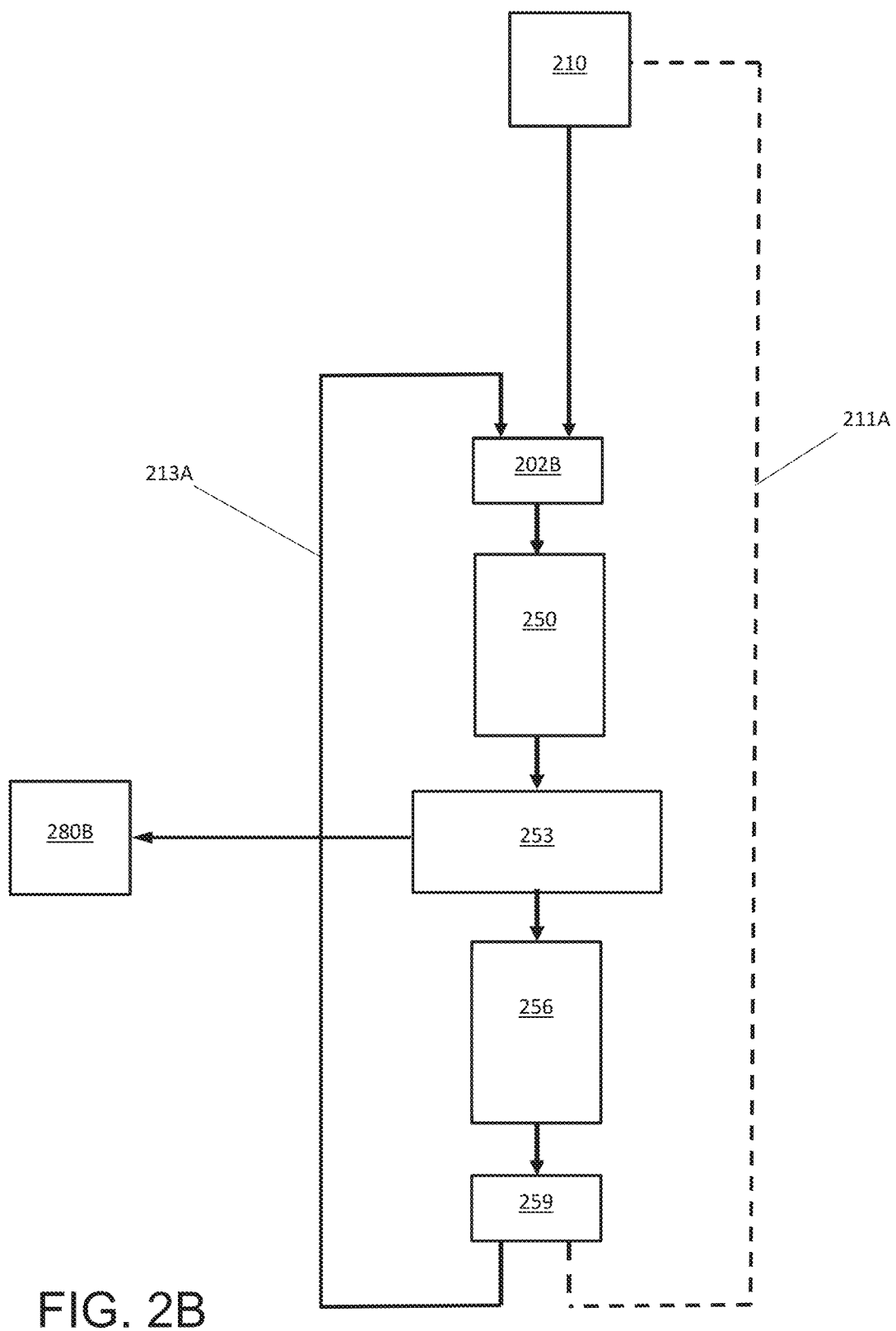
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
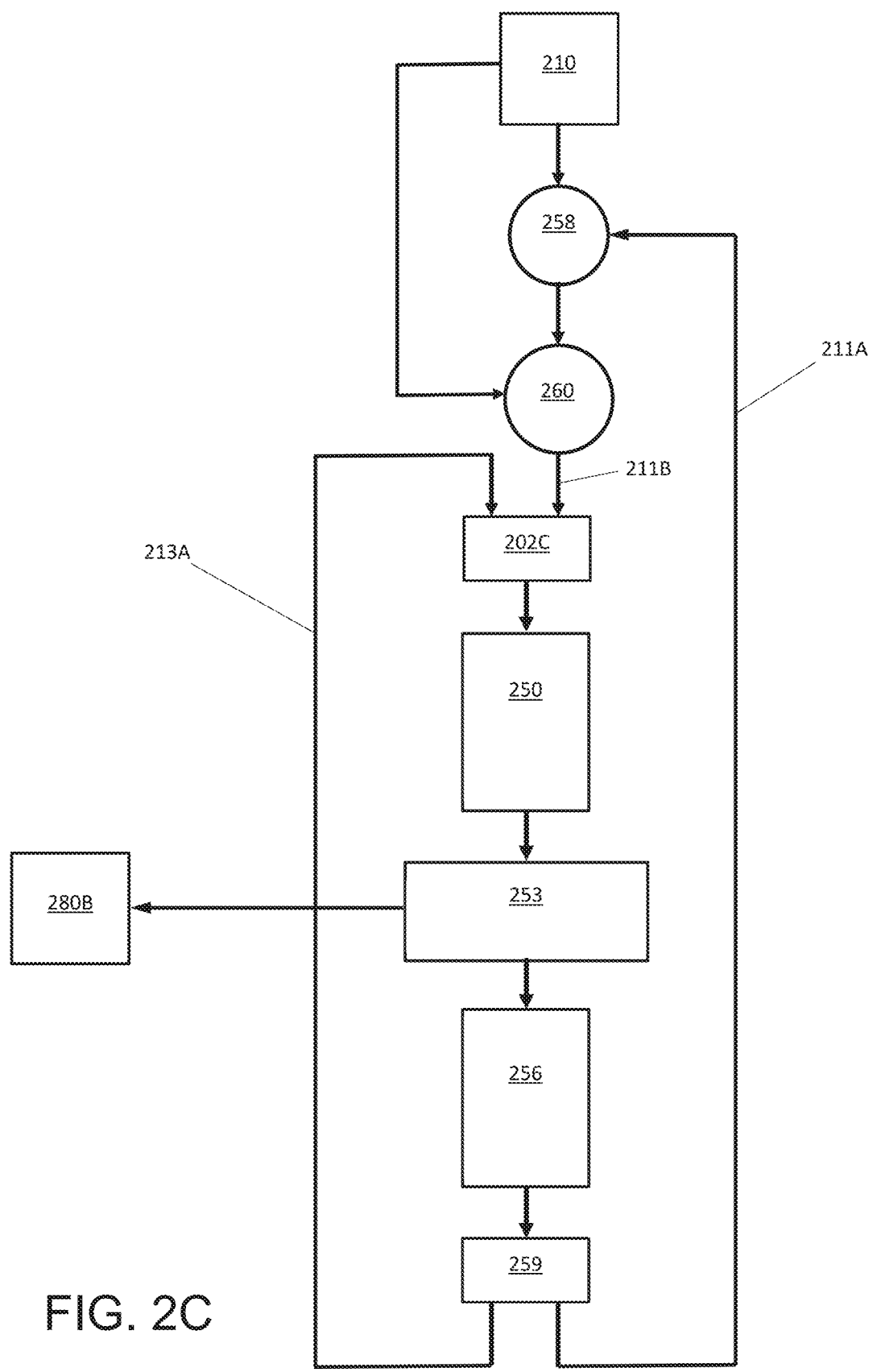
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_n[x,y] = F'\{\exp(i\ \psi_n[u,v])\}$$

$$\psi_n[u,v] = \angle F\{\eta \cdot \exp(i \angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods. As will be seen, subsequent Figures herein are described as comprising a point cloud method for hologram calculation. However other methods of hologram calculation, including the Fourier method described above in relation to FIGS. 2A to 2C, may instead be used.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
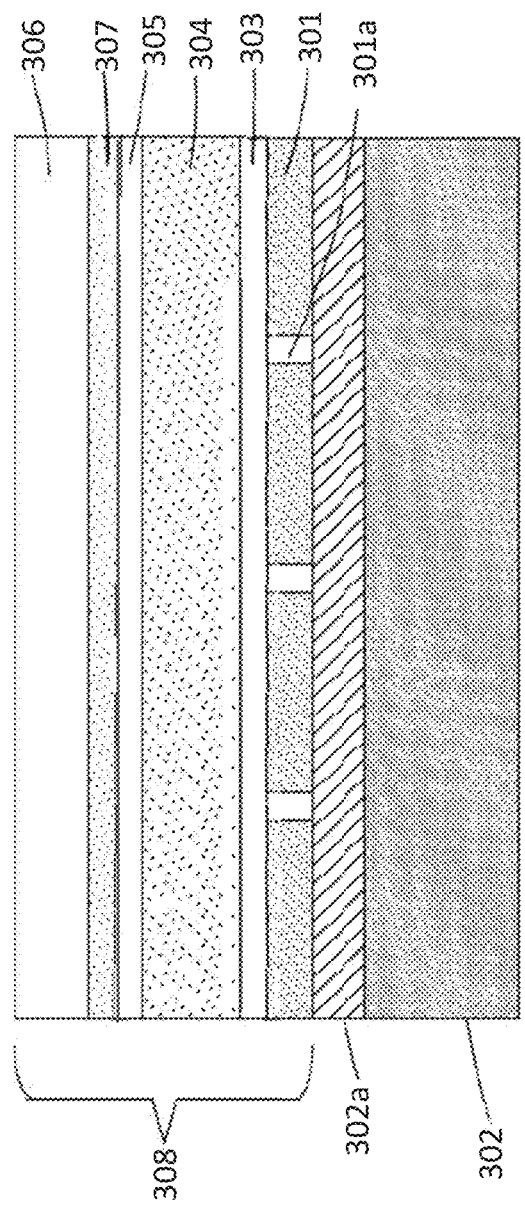
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Projection Using a Small Display Device and a Long Viewing Distance

The present disclosure relates to image projection wherein the separation between the display device and viewer is much greater than the size of the display device. The viewing distance (i.e. distance between the viewer and display device) may be at least an order of magnitude greater than the size of the display device. The viewing distance may be at least two orders of magnitude greater than the size of the display device. For example, the pixel area of the display device may be 10 mm×10 mm and the viewing distance may be 1 m. The image projected by the system is formed on a display plane that is spatially separated from the display device.

In accordance with the present disclosure, the image is formed by holographic projection. A hologram is displayed on the display device. The hologram is illuminated by a light source (not shown) and an image is perceived on a display plane that is spatially separated from the hologram. The image may be real or virtual. For the purpose of the explanation that follows, it is helpful to consider a virtual image formed upstream of the display device. That is, appearing behind the display device. However, it is not essential that the image is a virtual image and the present disclosure is equally applicable to a real image formed between the display device and viewing system.

The display device comprises pixels that display the hologram. The pixel structure of the display device is diffractive. The size of the holographic image is therefore governed by the rules of diffraction. A consequence of the diffractive nature of the display device is explained below with reference to FIG. 4.

Figure 4:
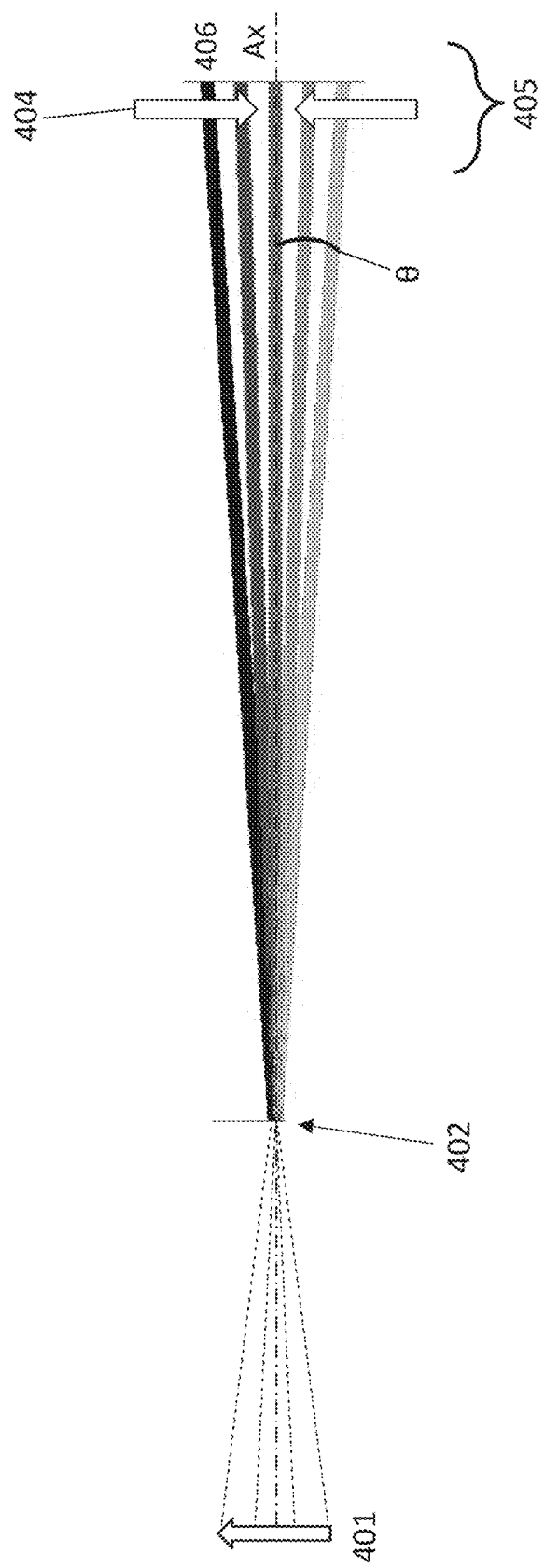
FIG. 4 shows angular content of a virtual image effectively propagating from a display device towards an aperture.

FIG. 4 shows a pixelated display device 402 arranged to display a hologram forming a virtual image 401 upstream of the display device 402. The diffraction angle, □, of the display device determines the size of the virtual image 401. The virtual image 401, display device 402 and viewing system 405 are arranged on an optical axis, Ax.

The viewing system 405 has an entrance aperture 404 and viewing plane 406. The viewing system 406 may be a human eye. The entrance aperture 404 may therefore be the pupil of the eye and the viewing plane 406 may be the retina of the eye.

The light travelling between the display device 402 and viewing system 405 is modulated with a hologram of the image (not the image itself). Each illustrated light ray bundle relates to a different part of the virtual image 401. More specifically, the light in each light ray bundle is encoded by the hologram with information about one part of the virtual image. FIG. 4 shows five example ray bundles each characterized by a respective angle to the optical axis, Ax, and each representing a respective part of the virtual image. In this example, one of the light bundles passes through the pupil 404 and the other four light bundles are blocked by the pupil 404. Again, the five different ray bundles correspond to five different parts of the virtual image 401. The full image content of the virtual image is effectively divided by angle. The light bundle travelling along the optical axis, Ax, carries the centre part of the image information—that is, the information relating to the centre of the image. The other light bundles carry the other parts of the image information. The two light bundles shown at the extremes of the light cone carry the edge parts of the image information. A consequence of this division of the image information by angle is that not all image content can pass through the entrance aperture 404 of the viewing system at a given viewing position. In other words, not all image content is received by the eye. In the example of FIG. 4, only one of the five light bundles illustrated passes through the pupil 404 at any viewing position. The reader will understand that five light bundles are shown by way of example only and the process described is not limited to division of the image information of the virtual image into only five light bundles.

In this example, the centre part of the image information is received by the eye. The edge part of the image information is blocked by the pupil of the eye. The reader will understand that if the viewer moves up or down, a different light bundle may be received by the eye and, for example, the centre part of the image information may be blocked. The viewer therefore only sees a portion of the full image. The rest of the image information is blocked by the entrance pupil. The view of the viewer is heavily restricted because they are effectively looking at the image through the small aperture of the display device itself.

In summary, light propagates over the range of diffraction angle from the display device. At a 1 m viewing distance, only a small range of angles from the display device can propagate through the eye's pupil to form image at the retina for a given eye position. The only parts of the virtual image that are visible are the ones falling within the small angular range shown in FIG. 4 that passes through the entrance aperture. Accordingly, the field of view is very small, and the specific angular range depends heavily on the eye position.

The problem of the small field of view and sensitivity to eye position explained with reference to FIG. 4 is a consequence of the large viewing distance and small aperture of the display device. The importance of viewing distance is explained further with reference to FIGS. 5 to 7.

Figure 5A:
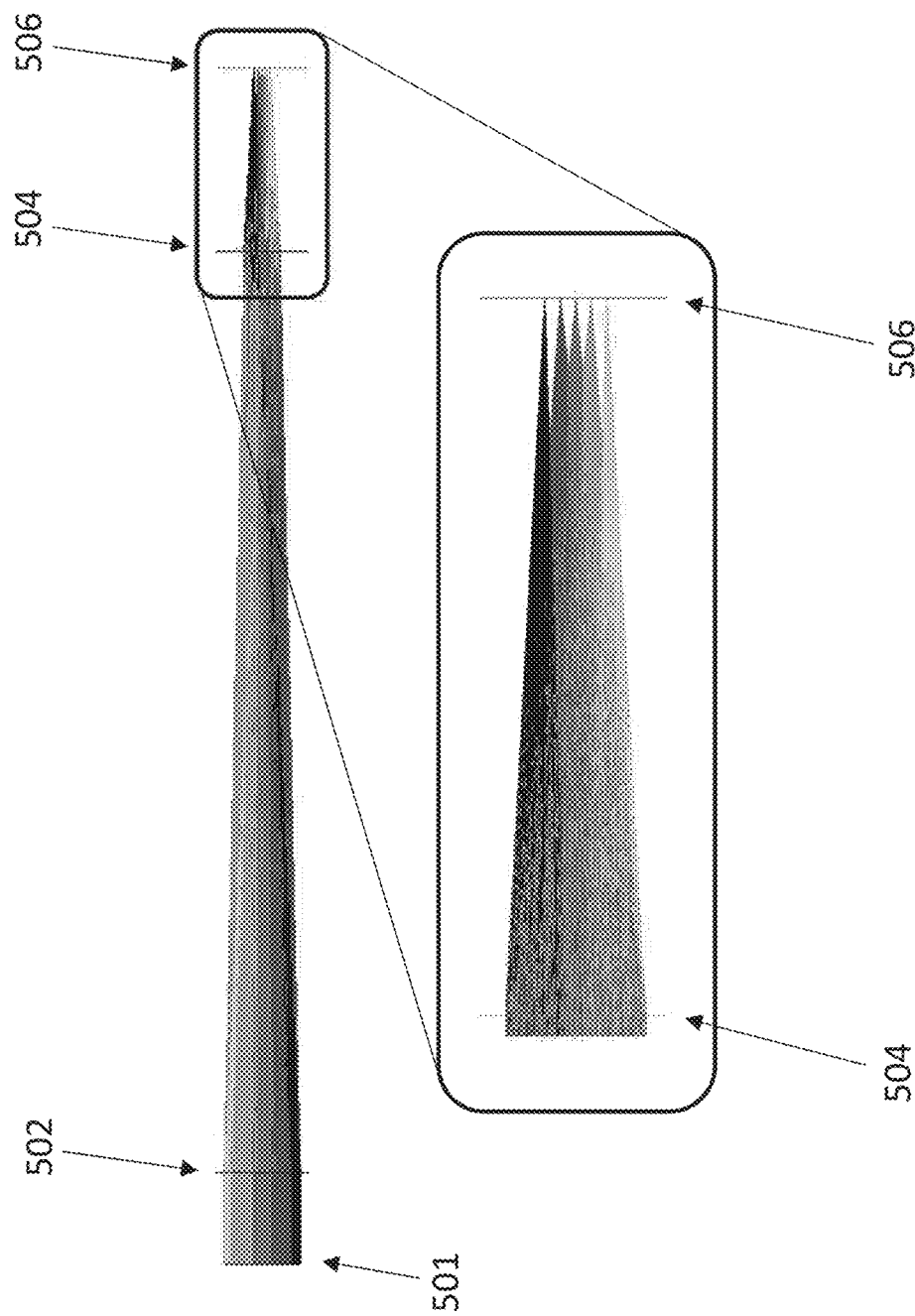
FIG. 5A shows a viewing system with a relatively small propagation distance.

FIG. 5A shows a display device 502 arranged to display a hologram and propagate light modulated in accordance with the hologram to a viewing system comprising an entrance aperture 504 and viewing plane 506. The virtual image 501 is at infinity and so the rays traced between the virtual image and display device are collimated. The lower part of FIG. 5A shows a magnified view of the viewing system. This figure is schematic and therefore physiological detail of the eye is not shown. In practice, there is, of course, a light source (not shown in FIG. 5A) arranged to illuminate the display device 502.

FIG. 5A only shows those rays of light that can propagate through the aperture 504; any other rays, which cannot pass through the aperture 504, are omitted. However, it will be understood that those other rays would also propagate from the display device 502, in practice. In FIG. 5A, the distance between the display device and viewing plane is small enough that the full diffraction angle from the display device can form the image on the retina. All light propagation paths shown from the virtual image pass through the entrance aperture. Accordingly, all points on the virtual image map onto the retina and all image content is delivered to the viewing plane. The field of view of the perceived image is therefore a maximum. At the optimum position, the field of view is equal to the diffraction angle of the display device. Interestingly, different image points on the retina are formed from light propagating from different regions on the display device 502—e.g., the image point closest to the top of FIG. 5A is formed from light propagating from the lower portion of the display device only. Light propagating from other regions of the display device does not contribute to this image point.

Figure 5B:
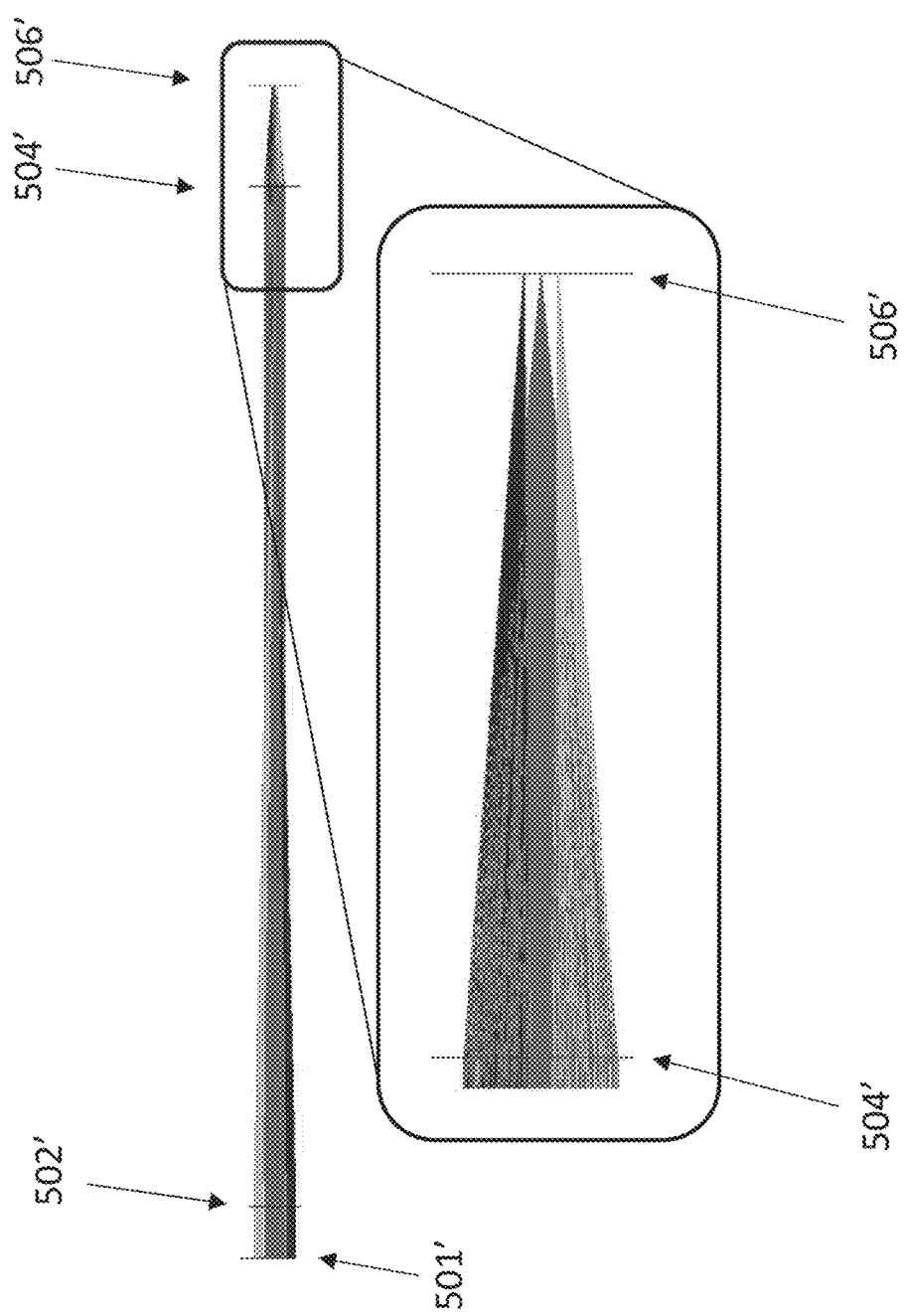
FIG. 5B shows a viewing system with a relatively large propagation distance.

FIG. 5B shows the situation that arises as the viewing distance is increased.

In more detail, FIG. 5B shows a display device 502' arranged to display a hologram and propagate light modulated in accordance with the hologram to a viewing system comprising an entrance aperture 504' and viewing plane 506'. The virtual image 501' is at infinity and so the rays traced between the virtual image and display device are collimated. The lower part of FIG. 5B shows a magnified view of the viewing system. This figure is schematic and therefore physiological detail of the eye is not shown. In practice, there is, of course, a light source (not shown in FIG. 5B) arranged to illuminate the display device 502'.

FIG. 5B only shows those rays of light that can propagate through the aperture 504'. At the larger viewing distance of FIG. 5B, some of the ray bundles are blocked by the entrance aperture 504'. Specifically, ray bundles associated with edge parts of the virtual image are blocked by the entrance pupil 504'. Accordingly, the entire virtual image is not visible and the part of the virtual image that is visible is heavily dependent on eye position. Thus, this illustrates that large distances between the display device and viewing system are problematic owing to the (relatively) small size of the display device.

Figure 6A:
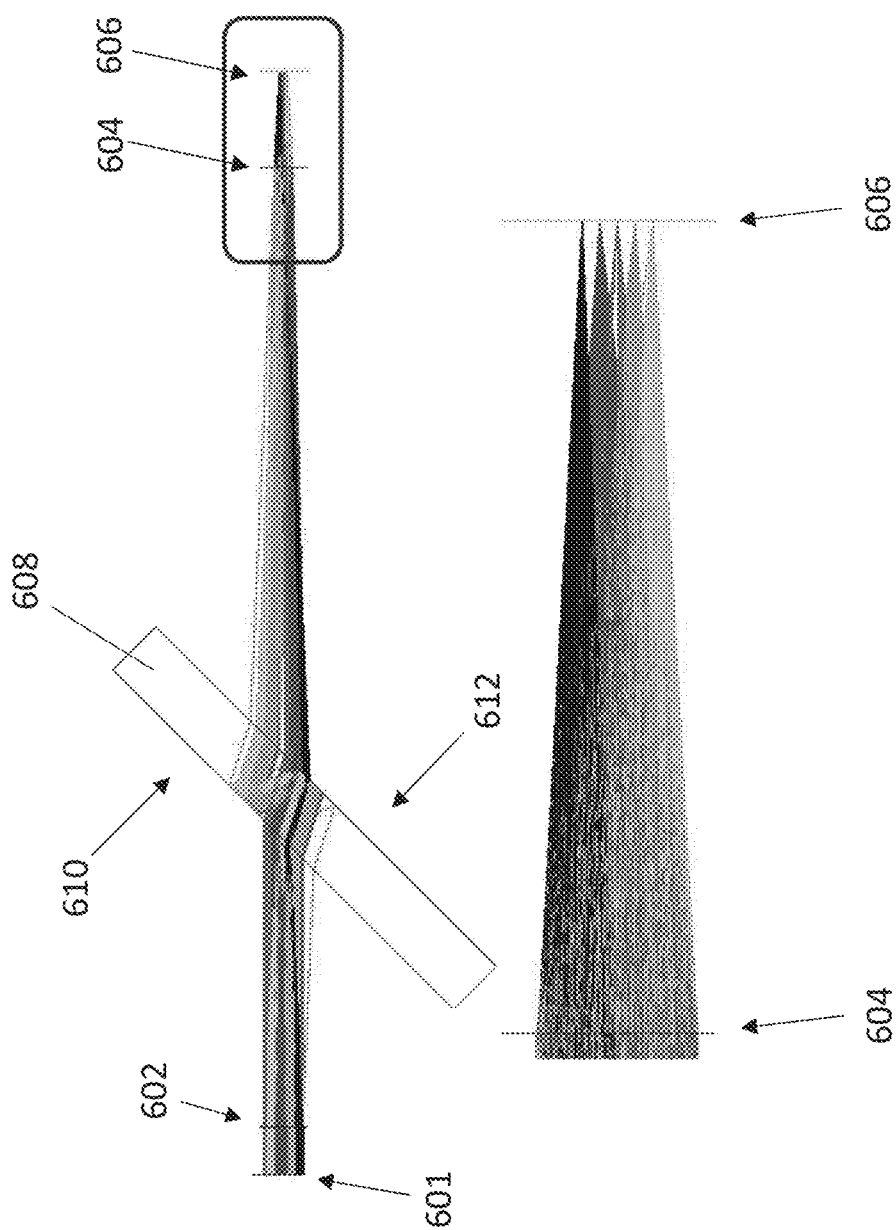
FIG. 6A shows a viewing system with a relatively large propagation distance, which includes a waveguide, for forming a virtual image at infinity.

FIG. 6A shows an improved system comprising a display device 602, propagating light that has been encoded with a hologram displayed on the display device 602, towards a viewing system that comprises an entrance aperture 604 and a viewing plane 606. In practice, there is, of course, a light source (not shown) arranged to illuminate the display device 602. The improved system further comprises a waveguide 608 positioned between the display device 602 and the entrance aperture 604. The lower part of FIG. 6A shows a magnified view of the entrance pupil 604 and the viewing plane 604. This figure is schematic and therefore physiological detail of the eye is not shown.

The viewing distance of FIG. 6 is the same as that of FIG. 5B. However, the ray bundles that were blocked in FIG. 5B are effectively recovered by the waveguide 608 such that the full image information is received by the viewing system—despite the longer viewing distance.

The presence of the waveguide 608 enables all angular content from the display device 602 to be received by the eye, even at this relatively large projection distance. This is because the waveguide 608 acts as a pupil expander, in a manner that is well known and so is described only briefly herein.

In brief, the waveguide 608 comprises a substantially elongate formation. In this example, it comprises an optical slab of refractive material, but other types of waveguide are also well known and may be used. The waveguide 608 is located so as to intersect the light cone that is projected from the display device 602, for example at an oblique angle. The size, location, and position of the waveguide 608 are configured to ensure that light from each of the five ray bundles, within the light cone, enters the waveguide 608. Light from the light cone enters the waveguide 608 via its first planar surface 610 (located nearest the display device 602) and is guided at least partially along the length of the waveguide 608, before being emitted via its second planar surface 612, substantially opposite the first surface 610 (located nearest the eye). As will be well understood, the second planar surface 612 is partially reflective, partially transmissive. In other words, when each ray of light travels, within the waveguide 608, from the first planar surface 610 to the second planar surface 612 of the waveguide 608, some of the light will be transmitted out of the waveguide 608 and some will be reflected by the second planar surface 612, back towards the first planar surface 610. The first planar surface 610 is reflective, such that all light that hits it, from within the waveguide 608, will be reflected back towards the second planar surface 612. Therefore, some of the light may simply be refracted between the two planar surfaces 610, 612 of the waveguide 608 before being transmitted, whilst other light may be reflected, and thus may undergo one or more reflections, (or 'bounces') between the planar surfaces 610, 612 of the waveguide 608, before being transmitted. A net effect of the waveguide 608 is therefore that the transmission of the light is effectively expanded across multiple locations on the second planar surface 612 of the waveguide 608. All angular content output by the display device 602 may thus be present, at a greater number of positions on the display plane (and at a greater number of positions on the aperture plane) than would have been the case, in the absence of the waveguide 608. This means that light from each ray bundle may enter the entrance aperture 604 and contribute to an image formed by the viewing plane 606, despite the relatively large projection distance. In other words, all angular content from the display device 602 can be received by the eye. Therefore, the full diffraction angle of the display device 602 is utilised and the viewing window is maximised for the user. In turn, this means that all the light rays contribute to the perceived virtual image 601.

Figure 6B:
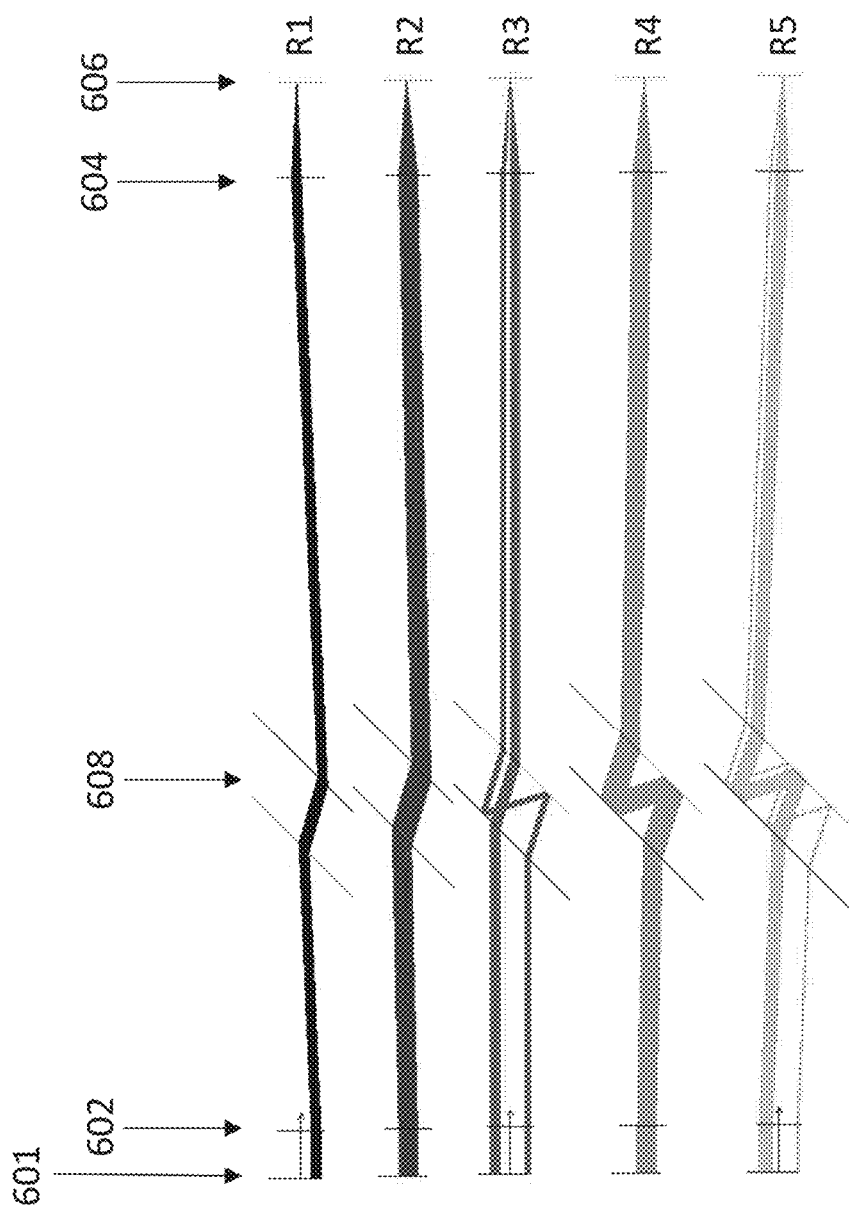

FIG. 6B shows the individual optical paths for each of the five ray bundles that contribute to five respective image points within the virtual image 601 that is formed in FIG. 6A—labelled from top to bottom as R1 to R5, respectively. As can be seen therein, the light of each of R1 and R2 is simply refracted and then transmitted by the waveguide 608. The light of R4, on the other hand, encounters a single bounce before being transmitted. The light of R3 comprises some light from a corresponding first part of the display device 602 that is simply refracted by the waveguide 608 before being transmitted, and some light from a second, different corresponding part of the display device 602 that encounters a single bounce before being transmitted. Similarly, the light of R5 comprises some light from a corresponding first part of the display device 602 that encounters a single bounce before being transmitted and some light from a second, different corresponding part of the display device 602 that encounters two bounces before being transmitted. For each of R3 and R5, two different parts of the LCOS propagate light corresponding to that part of the virtual image.

The present inventors have recognised that, at least in some applications, it is preferable for the virtual image distance—i.e., for the distance from the viewer to the virtual image—to be finite, as opposed to the virtual image being formed at infinity. In certain applications, there will be a preferred virtual image distance, at which it is desirable or necessary for the virtual image content to appear. For example, this can be the case in a head-up display, for example in an automotive setting, for example if virtual image content is to be superimposed onto real content that is being viewed by the viewer through a vehicle windscreen. For example, a desired virtual image distance may comprise the virtual image content being formed a few metres, for example 3 metres or 5 metres, in front of the viewer's vehicle or windscreen.

Figure 7:
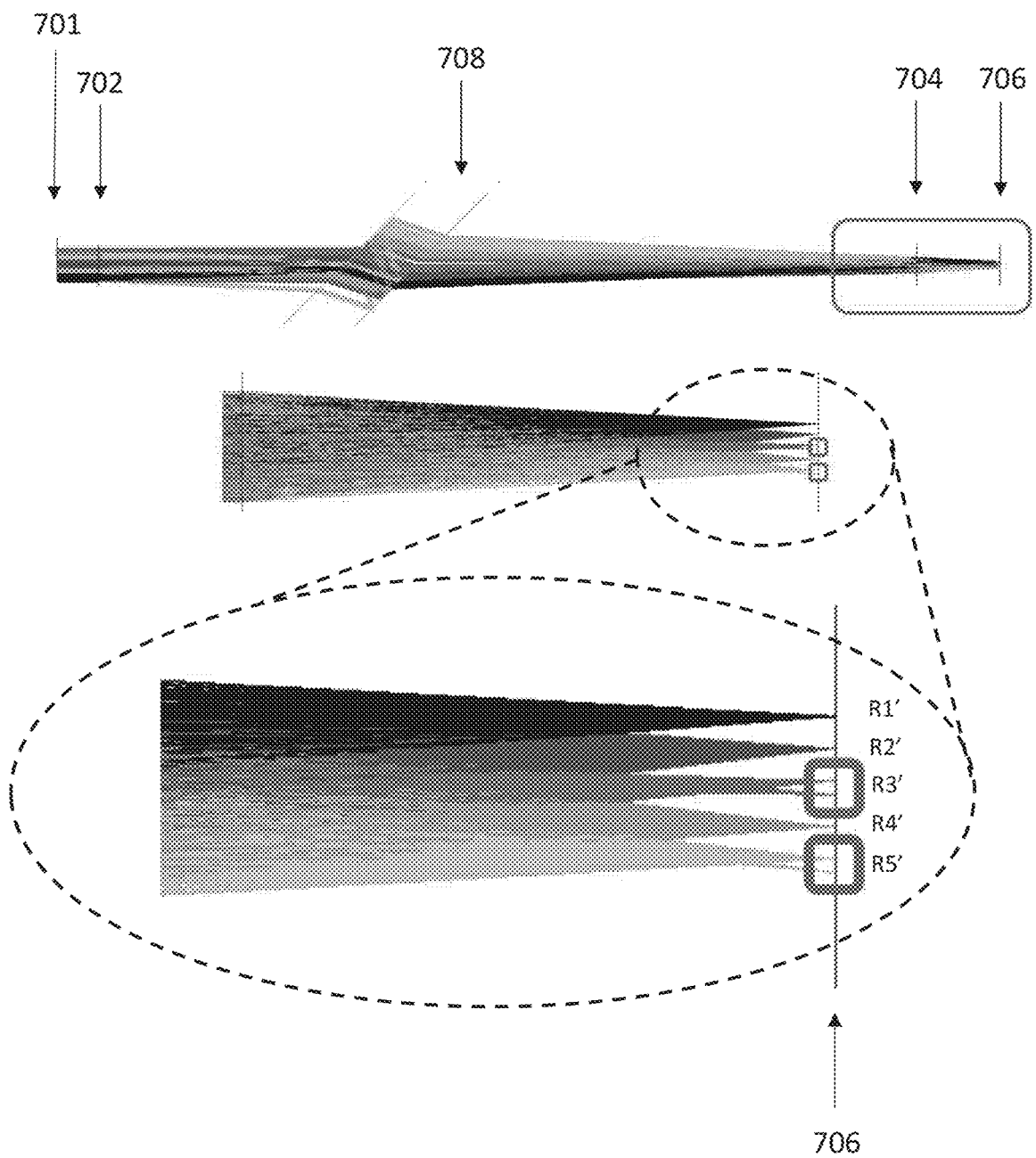
FIG. 7 shows how with a finite virtual image and waveguide pupil expander, ghost images can be formed.

The top part of FIG. 7 shows a system comprising a display device 702 propagating light 703, that has been encoded with (i.e., modulated in accordance with) a hologram displayed on the display device 702, towards an eye that comprises an entrance aperture 704 and a viewing plane 706. There is a light source (not shown) arranged to illuminate the display device 702. The system further comprises a waveguide 708 positioned between the display device 702 and the entrance aperture 704, to act as a pupil expander as described in detail in relation to FIG. 6a, above. The middle part of FIG. 7 shows a magnified view of the entrance aperture 704 and the viewing plane 706, and the lowest part of FIG. 7 shows a further magnified view of the viewing plane 706. This Figure is schematic and therefore physiological detail of the eye is not shown. In this arrangement, the eye perceives the virtual image 701 as being located at a finite distance, upstream of the display device 702. The rays between the virtual image 701 and display device are divergent because the virtual image distance is finite.

As per FIG. 6A, above, the presence of the waveguide 708 in FIG. 7 effectively enables the full diffractive angle of the display device 702 to be accessed at a relatively large projection distance, such that the full image content is visible to the user at the viewing position shown.

However, a further technical problem is introduced. The different optical paths of light from different parts of the display device 702, for certain of the ray bundles, can lead to those ray bundles each forming multiple image points on the retina 706 when the virtual image is formed at a finite virtual image distance. This is shown in relation to the ray bundles labelled R3' and R5' in FIG. 7a. The additional image points that are formed, which are subsidiary to a main image point for a given point within the virtual image, can be referred to as 'ghost image points' and collectively they form 'ghost images' or simply 'ghosts'. As the person skilled in the art of image formation will appreciate, the formation of ghosts can cause blurring and a general decrease in the perceived quality of a virtual image, from the viewer's perspective. This is particularly true if the "ghost" partially overlaps the "main" image.

Figure 8:
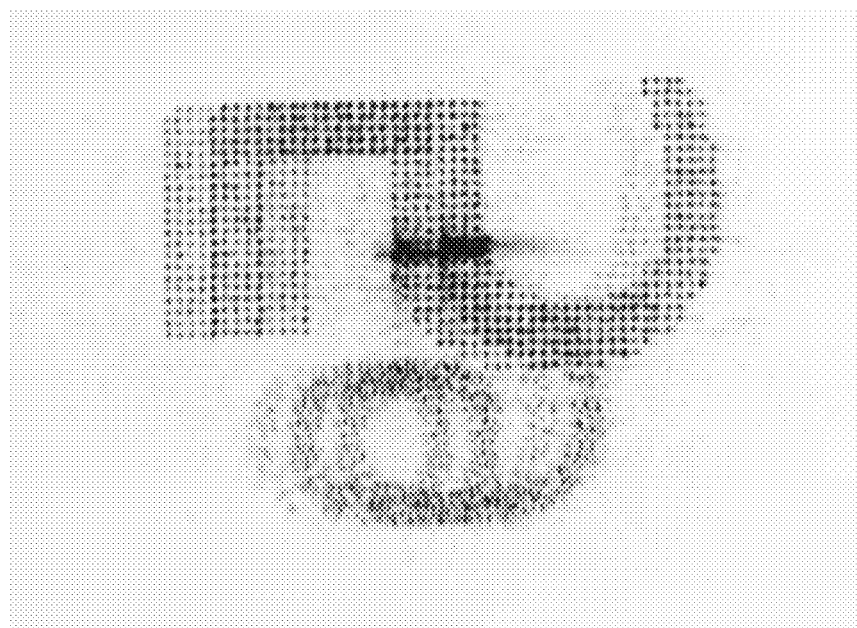
FIG. 8 shows a virtual image that comprises a primary image and two ghost images.

FIG. 8 shows an example of a virtual image of the numbers '5' and '9', created using a viewing system similar to that shown in FIG. 7a, that includes ghost images in addition to a main image. The main image can be seen as the brightest, central image for each number, with ghosts to the left and the right. In the example of FIG. 8, the '9' is formed when the viewing distance is larger than it is for the '5', therefore the blurring is more pronounced for it. But this is just one illustrative example, and should not be regarded as limiting on the present disclosure.

The inventors have addressed the problem of the ghost images. The inventors have recognised that it is desirable to provide a viewing system in which a virtual image can be formed at a finite virtual image distance, which comprises all the angular image content that is output by a display device, and which reduces or removes the formation of ghost images. Moreover, the inventors have found that, as the size of a viewing aperture increases in a conventional viewing system, the risk of forming ghost image points increases, because the aperture can admit additional light rays, which may form additional image points on the display plane. Therefore, it is desirable to provide an improved viewing system that can accommodate apertures of different sizes, whilst still reducing or removing the formation of ghost images. The solutions provided by the inventors, detailed below, are applicable to a range of different sizes of—and arrangements of—aperture, waveguide, and display device, and may be applied for different propagation distances, for which one or more ghost images may conventionally be formed.

In overview, the inventors have recognised that it is possible to provide a light engine for generating a hologram that, in effect, identifies one or more areas of a display device that would, in a conventional arrangement, contribute to one or more ghost images, wherein the hologram is derived in order to control the contributions from those one or more areas of the display device, and thus to avoid or reduce the formation of ghost image points when the hologram is displayed on the display device and illuminated. The inventors have further recognised that it is possible to provide a hologram engine for provision of such a hologram, and to provide an improved viewing system for the display and illumination of an improved hologram, for the formation of improved images, even when the projection distances in the viewing system are relatively large and the display device and/or the viewing aperture is relatively small.

The inventors have recognised that, because of the angular restrictions imposed by having a viewing system that includes a waveguide—such as that shown in FIGS. 6A and 7A herein—comprising a relatively small viewing aperture, and optionally also a relatively small display device, it is possible to consider the different possible propagation paths within the waveguide separately. Moreover, they have recognised that, as a result of such consideration, it is possible to identify each of: areas of the display device that are the source of light contributing to a desired 'main' image; areas of the display device that are the source of light contributing to an undesirable 'ghost' image; and areas of the display device that are the source of light that is blocked by the aperture and thus do not contribute to either the main image or a ghost image. The inventors have further recognised that it is possible to limit the hologram calculation to only areas of the display device that contribute to the main image. They have further recognised that, in a further improvement, in some embodiments, an improved hologram may be provided, which in effect may cause one or more of the ghost images to be translated, so as to be superimposed onto a main image.

The recognitions made by the inventors, and the improved systems and methods embodying those recognitions, may be further understood with reference to the figures as detailed below.

Figure 9A:
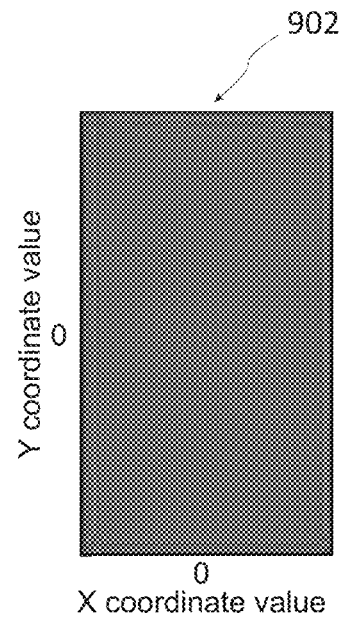
FIGS. 9A to 9C shows an example in which the entire LCOS is used to form an primary image point and two corresponding ghost image points.
Figure 9B:
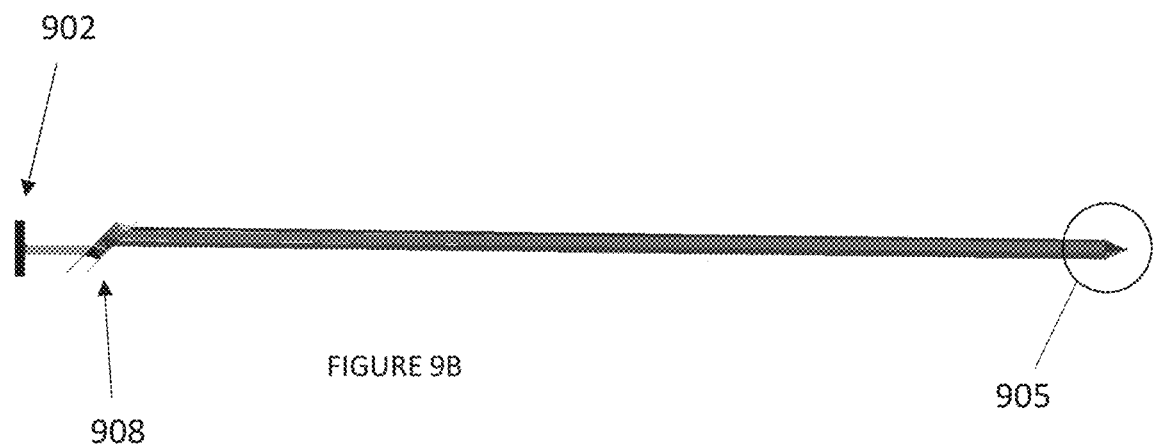
Figure 9C:
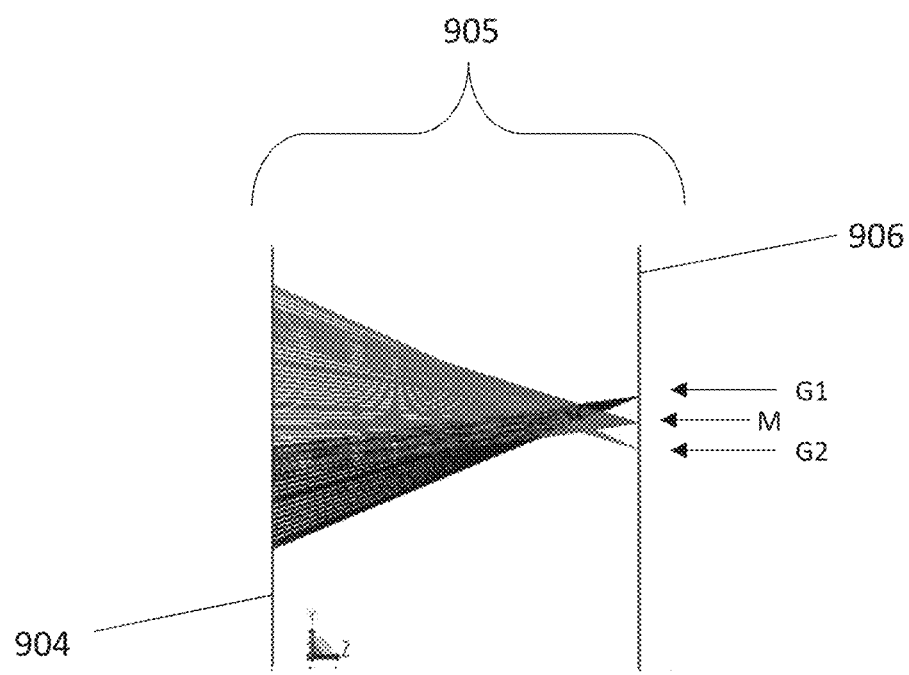

FIGS. 9A to 9C show a display device 902, which in this example is an LCOS spatial light modulator. Reference to "LCOS" in the following is made as shorthand for "display device". The teachings of the present disclosure are not limited to an LCOS display device. FIG. 9B traces the light rays in relation to one virtual image point from the LCOS 902, via a waveguide 908, towards a viewing entity/system 905, which in this example comprises a viewer's eye. FIG. 9C further comprise a magnified view of the eye 905, showing the rays at the pupil 904 (i.e., the entrance aperture) and the retina 906 (i.e., the sensor or viewing plane). In this example, the entire LCOS area contributes to formation of the image point on the retina 906. In other words, the entirety of the LCOS 902 is 'visible' to the viewer. This contribution of the entire LCOS 902, to the image, is illustrated by the entirety of the LCOS being shaded, denoting its whole surface area as a 'contributory area'.

As can be seen, the light traced from the LCOS 902 in FIGS. 9B and 9C leads to the formation of three image points—labelled as G1 M and G2, respectively—on the retina 906 for this particular virtual image point. The middle image point 'M' comprises a main image point, which contributes to the primary/main virtual image perceived by the viewer. The top image point G1 comprises a first ghost image point and the bottom image point G2 comprises a second, different ghost image point of the same virtual image point. Notably, in a yet further advancement, the inventors have recognised that it is possible to identify the region(s) of the LCOS 902 that contribute to the main image point M and/or to the ghost image points G1, G2.

Figure 10A:
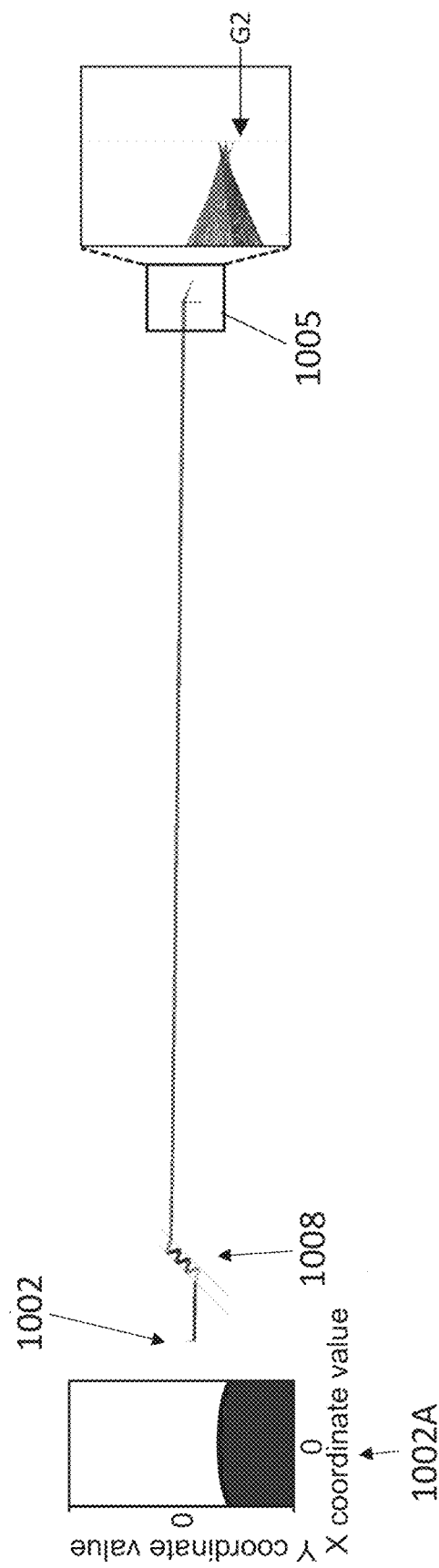

FIGS. 10A to 10C show the LCOS 902 and ray diagram of FIGS. 9A to 9C divided up into three respective propagation paths—the first of which comprises the light that contributes to the bottom ghost image point G2, the second of which comprises the light that contributes to the main image point M, and the third of which comprises the light that contributes to the top ghost image point G1. As can be seen in FIG. 10A, the light that contributes to G2 bounces three times before being transmitted by the waveguide 908. As can be seen in FIG. 10B, the light that contributes to M bounces twice before being transmitted by the waveguide

908. As can be seen in FIG. 10C, the light that contributes to G1 bounces once before being transmitted by the waveguide 908.

Each FIG. 10A, 10B, 10C) also shows, illustrated by shading, the portion(s) of the LCOS 902 that contribute to the respective image point. Thus, it can be seen that the bottom ghost image point G2 is contributed to by a region towards the lower part of the LCOS 902, the top ghost image point G1 is contributed to by a region towards the upper part of the LCOS 902, and the main image point is contributed to by the entire LCOS 902.

The aperture 904 (i.e., the viewer's pupil) is relatively wide in the example of FIGS. 9 and 10$a$ to 10$c$, which explains why the entire LCOS 902 contributes to the main image point. In other words, the f-number of the viewing system is relatively low in this example. FIGS. 10A to 10C show that, although parts of the LCOS 902 also contribute to one or other ghost image G1, G2, there is a region of the LCOS 902 that contributes to neither ghost image G1, G2, but only contributes to the main image point M. The inventors have recognised that this region may be identified as being a contributory area, for the LCOS 902 in this example—more specifically, it may be identified as being a 'primary contributory area', as will be understood further from the description of the subsequent Figures. It can therefore be seen, in this case, that the primary contributory region is not limited to being a circle or ellipse and may take other more complex shapes.

Figure 11A:
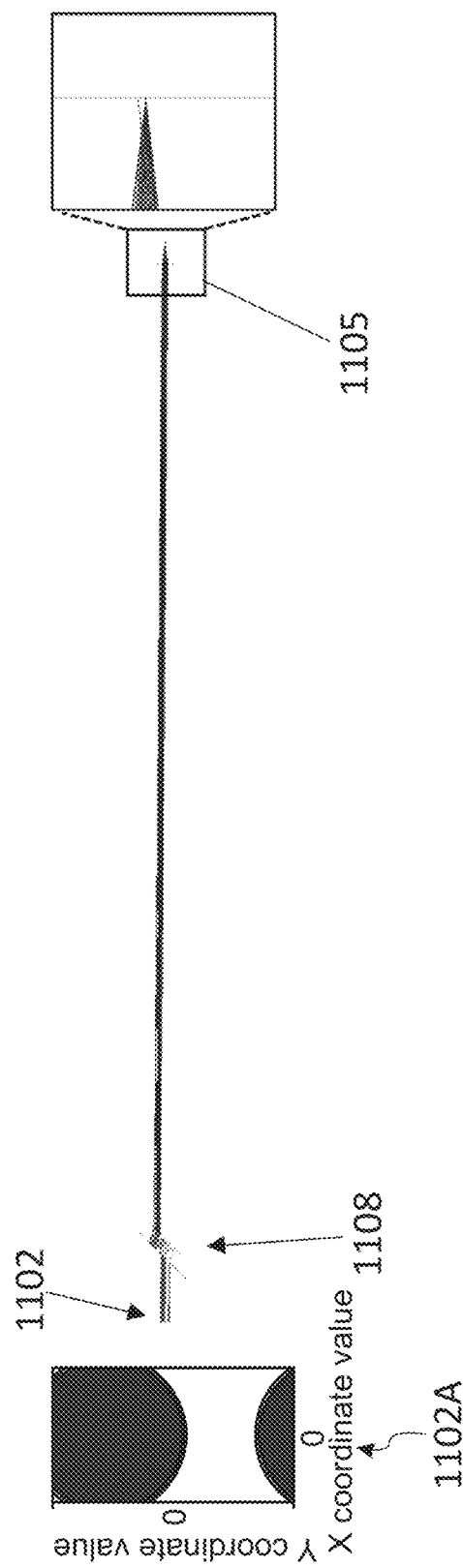
FIG. 11A to 11C shows three the propagation path and LCOS utilisation in relation to three different field/image points.
Figure 11B:
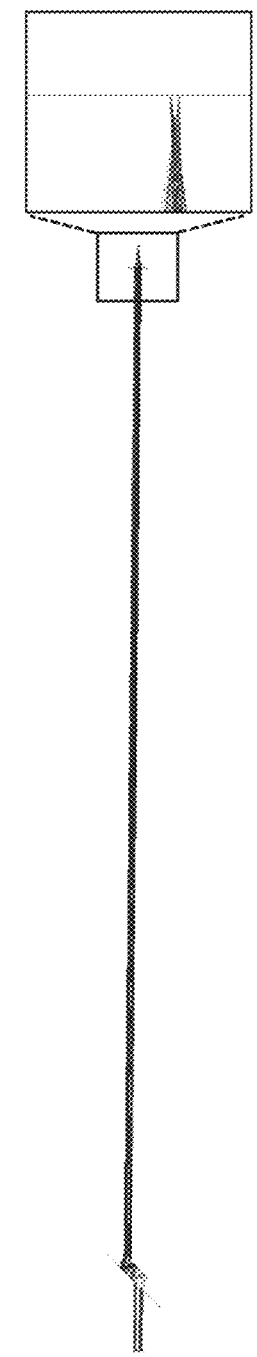
Figure 11B:
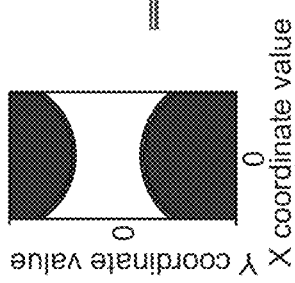
Figure 11C:
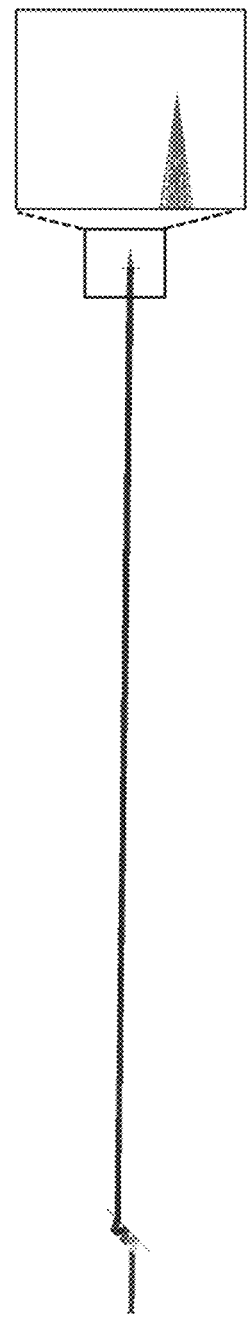
Figure 11C:
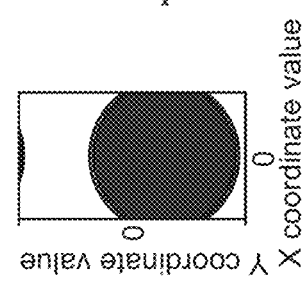

FIGS. 11A to 11C show the corresponding ray diagrams for different points of the virtual image when the entrance aperture is relatively small (i.e. the f-number is relatively high). FIG. 11A relates to a first field point of the virtual image (i.e. a first virtual image point), FIG. 11B relates to a second field point of the virtual image and FIG. 11C relates to a third field point of the virtual image. FIGS. 11A to 11C show that not all of the LCOS 902 contributes to the main image point. In fact, FIGS. 11A to 11C show that a first region of the LCOS correspond to the main image points (herein refer to as a "primary contributory area") and a second region of the LCOS corresponding to the ghost image points (herein referred to as a "secondary contributory area").

The inventors have recognised that, under certain conditions, different respective regions of the LCOS 902 (or other display device, in a viewing system) will contribute either to a main image or to a ghost image or will not contribute to any visible part of an image. They have further recognised that the hologram determination process can be optimised using this information. For example, light from certain parts of the display device may be omitted, or, in some cases, the manner in which certain parts of the display device are encoded, by the hologram, may be changed so as to contribute positively to the main image, instead of contributing to a ghost image. Furthermore, additional areas of the display device may be identified, which may be configured to contribute positively to the main image.

The recognitions made by the inventors will be described below in relation to point cloud holograms by way of one example. However, they may be applied to other types of hologram such as a Fourier or Fresnel hologram. That is, other hologram calculation methods can be optimised using the LCOS information that can be determined in accordance with this disclosure.

As will be well understood, usually for calculation of a point cloud hologram of an image (such as a virtual image), the image is broken down into (i.e., represented by) a plurality of individual points—referred to herein as 'virtual points', since we describe the formation of virtual images. A spherical wave (or 'wavelet') is then propagated computationally—i.e., using a model or other theoretical tool—from each virtual point, at its intended or desired location, within the virtual image, to the plane of the display device—such as the plane of the LCOS, in the examples described hereabove. The way in which such wavelets would interfere with one another is considered and the resulting amplitude and/or phase of the wavelet that would be received at each pixel of the display device is calculated. The display device can then be tuned, in a manner that is well known and so will not be described herein, to exhibit the amplitude and/or phase modulation that is required at each pixel location, in order to mimic the calculated wavelets, and thus to create a hologram of the image.

The inventors have recognised that, for a viewing system with a waveguide and large viewing distance as described herein, if the entire display device is populated with the net amplitude and phase of the corresponding wavelets of all the virtual points, the hologram that will be created may, when displayed and illuminated, generate one or more ghost images as well as a main image. For example, this may occur when the viewing system is configured so that a virtual image is perceived at a finite distance from the viewer. Moreover, in many cases, light rays emitted from the pixels in some parts of the device will be wasted (i.e., they will not contribute to the image that the viewer sees or perceives) because the physical constraints of the viewing system (such as a small aperture and/or a small display device and/or a large projection distance) will dictate that light from those parts of the device will not enter the viewer's eye. Therefore, the inventors have recognised that an intelligent selection may be applied, in respect of which portions of the display device are tuned to provide a hologram. Specifically, if only those portions (or, parts, or, regions) of the LCOS that contribute to a main image are selected—and if wavelets are computationally propagated only from the virtual points of the intended virtual image, to those portions of the LCOS—and not to other portions of the LCOS, which do not contribute to the main image—the resulting amplitude and/or phase of the wavelet that would be received at each pixel within the selected region of the display device can be calculated. No calculation is needed for any respective other parts of the display device.

The display device can then be tuned, in accordance with the improved calculation, to exhibit the amplitude and phase modulation that is required at each pixel location, within the selected portion(s), in order to mimic the calculated wavelets, and thus to create a hologram of the main image. When this is done, there will be no tuning of any other portions of the LCOS, and therefore no image information will propagate from those other portions, to the viewer's eye (or other viewing entity), when the calculated hologram is displayed on the display device and illuminated. Therefore, there will be no information available to the viewer, which could lead to it forming an undesirable "ghost" image point. As a result, the ghost(s) is/are eliminated or 'quenched'. Moreover, no computation or image information is wasted, since only those pixels of the display device that are known to provide light that will be admitted through the viewer's pupil (or, through the aperture of a corresponding other viewing entity), for a given set of conditions (such as for a particular aperture width and location of the eye), will be tuned.

Figure 12A:
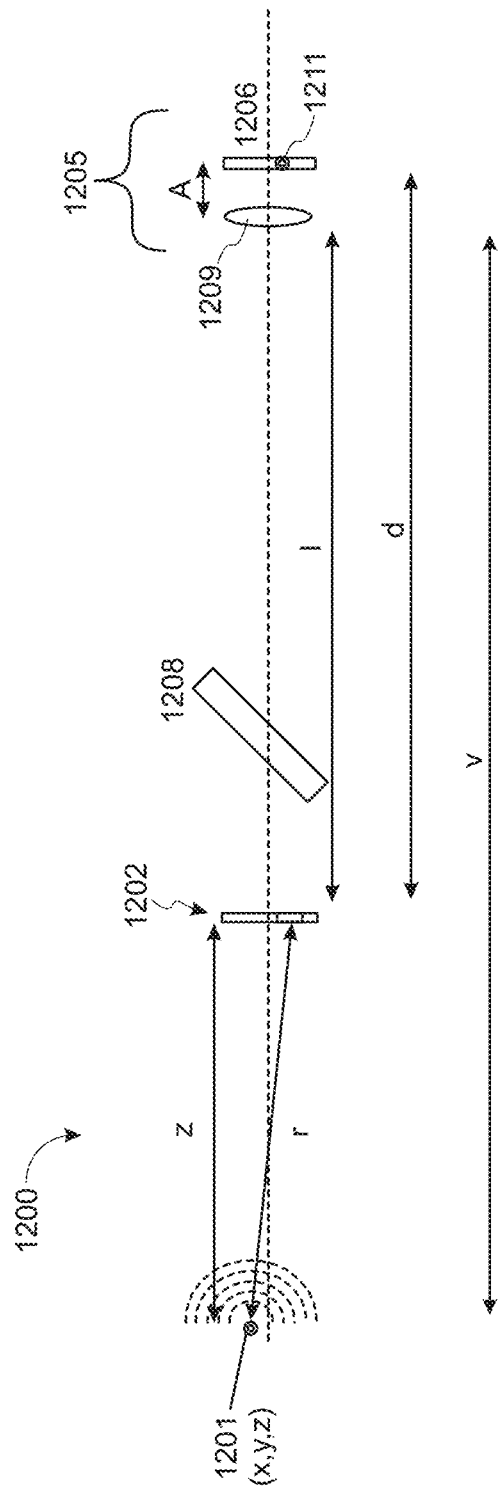
FIG. 12A shows a viewing system including a virtual image point and an image of that virtual image point formed by a viewing system and waveguide.
Figure 12B:
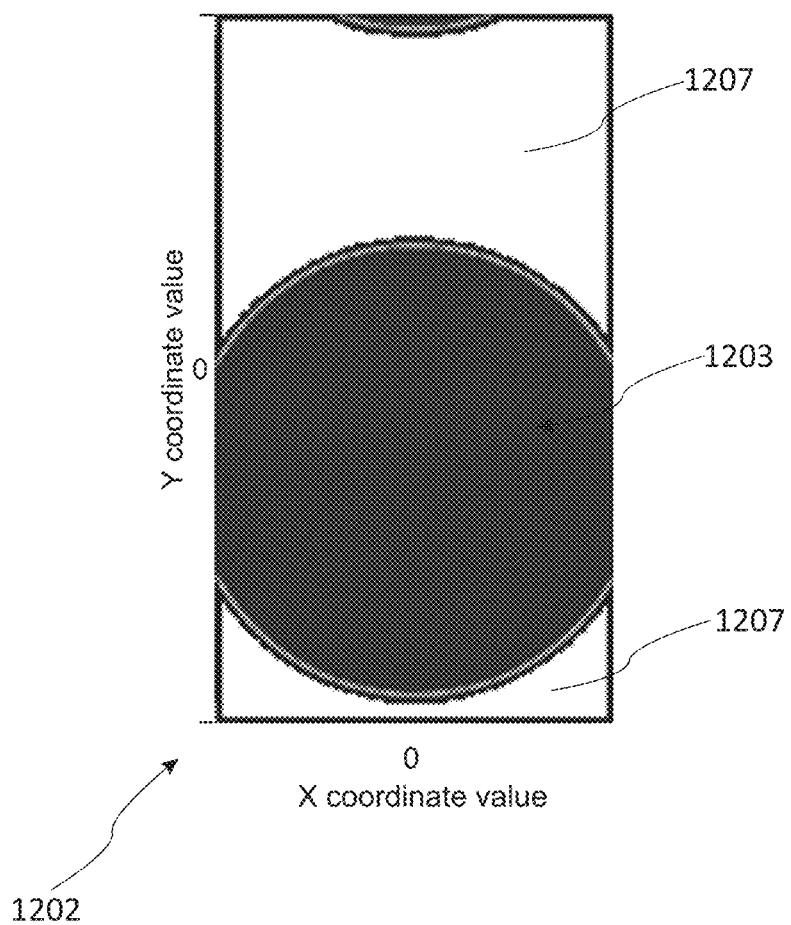
FIG. 12B shows the primary contributory area of the LCOS in relation to the example of FIG. 12A.

FIGS. 12A and 12B show a system 1200 forming a virtual image comprising an example virtual point 1201. The viewing system 1200 comprises a display device 1202, which in this example is an LCOS SLM, which comprises a contributory area 1203 and a non-contributory area 1207, identified in accordance with the present disclosure. The display device 1202 is arranged to display a hologram of the virtual image and to project light that has been encoded in accordance with the hologram, towards an eye 1205 that comprises a pupil (not shown) that acts as an aperture, a lens 1209, and a retina 1206 that acts as a viewing plane. The lens 1209 and retina are separated by a separation distance 'A'. There is a light source (not shown) arranged to illuminate the display device 1202. The viewing system 1200 further comprises a waveguide 1208 positioned between the LCOS 1202 and the eye 1205. This image is schematic and therefore physiological detail of the eye is not shown.

The virtual point 1201 is located upstream of the display device 1202, which in FIGS. 12A and 12B is depicted by the virtual point 1201 being to the left of the display device 1202. The virtual point 1201 has a location defined by spatial coordinates, which in this example comprise Cartesian (x, y, z) coordinates but other coordinate systems or other means of identifying the virtual point's location may be used. A distance 'z' is defined between the virtual point 1201 and the display device 1202, in a direction substantially parallel to the optical axis of the display device 1202. There is also a display-to-lens distance '1' defined between the display device 1201 and the eye lens 1209 is, in a direction substantially parallel to the optical axis of the display device 1201. The numerical values of both 'z' and '1' will vary dependent on the particular arrangements of the viewing system 1200, at a given time, including viewer position. For example, the display-to-lens distance '1' may be of the order of approximately 1 metre and the display-to-image distance 'z' may be larger, for example of the order of a few metres. But these numerical examples are purely illustrative and should not be regarded as being limiting.

The inventors have recognised that, if a virtual image comprising the virtual image point 1201 is to be perceived, by a viewer, at the location depicted in FIG. 12A, a corresponding image point 1211 must be formed on the retina 1206. Light rays can be tracked from the virtual point 1201 of the virtual image to a corresponding point 1211 on the retina 1211, via the LCOS 1202.

It will be appreciated that more than one possible optical path may be taken, between the virtual point 1201 and its corresponding point 1211 on the retina, via the LCOS 1202 owing to the possible paths created/generated by the waveguide 1208. According to embodiments, a chief light ray may be determined, which comprises a light ray path amongst a plurality of light ray paths, between the virtual image point 1201 and the corresponding point 1211, on the viewing plane (i.e., the retina 1206). When this chief ray path is identified, the number of bounces that the light undergoes within the waveguide is determined. That number of bounces (B) can be set as being the number of bounces for which rays should be traced, between the virtual image and the viewing plane. According to embodiments, the chief ray—and the associated number (B) of bounces—may be identified, as an initial step.

In the present example, ray tracing can determine the portion of the LCOS 1202 through which the 'chief ray' light travels, between each virtual image point 1201 to the corresponding point 1211 on the retina, in order to identify the 'contributory area' 1203 for that virtual image point 1201. There is therefore a light ray 'r' depicted as propagating between the virtual image point 1201 and the contributory area 1203 of the display device 1202 in FIG. 12A. In accordance with the recognitions made by the inventors, only wavelets contributing to the contributory area of the LCOS need to be modelled (or otherwise computationally considered), from the virtual image point 1201 and the display device 1202. In other words, only the identified contributory area 1203 of the display device 1202 needs to be encoded (or, 'tuned')—in order to generate an appropriate hologram. Such a hologram, when encoded on the display device and suitably illuminated, would enable the virtual image point 1201 to be perceived by the viewer without any ghost images of that virtual point 1201 also being present. This can be understood further from FIGS. 13 and 14, discussed below.

The contributory area 1203 in FIGS. 12A and 12B—and the contributory areas discussed in relation to FIGS. 13 and 14 below—may be sized and shaped based on the size and shape of the entrance aperture of the corresponding viewing entity and of the associated optics (e.g., waveguide geometry, any reflections within a larger optical system, and so on). Therefore, when the viewing entity is a human eye, the contributory area on the display device may, in some cases, comprise a substantially circular, or elliptical, shape, or any other suitable shape such as a complex shape, of a similar size to the receiving pupil. However, the present disclosure encompasses more complex shapes for the contributory area. Eye pupil diameter may be measured or estimated in any suitable way. For example, measurement of the eye pupil diameter may be carried out by an eye tracking system. Alternatively, it may be estimated based on known ranges of pupil diameter of the eye (e.g. 2-6 mm) or based on another estimate given the ambient light conditions at a given time.

The contributory area may be set so as to deliberately contribute to an area (on the aperture plane) that is a little larger than the pupil, and/or to contribute to an area (on the aperture plane) that is a slightly different shape to the pupil (or other aperture). In such a case, not all light from a "contributory area" may pass through the pupil at all times, but the eye would be able to move around a little while still collecting sufficient light to form a good image on the retina.

Figure 13:
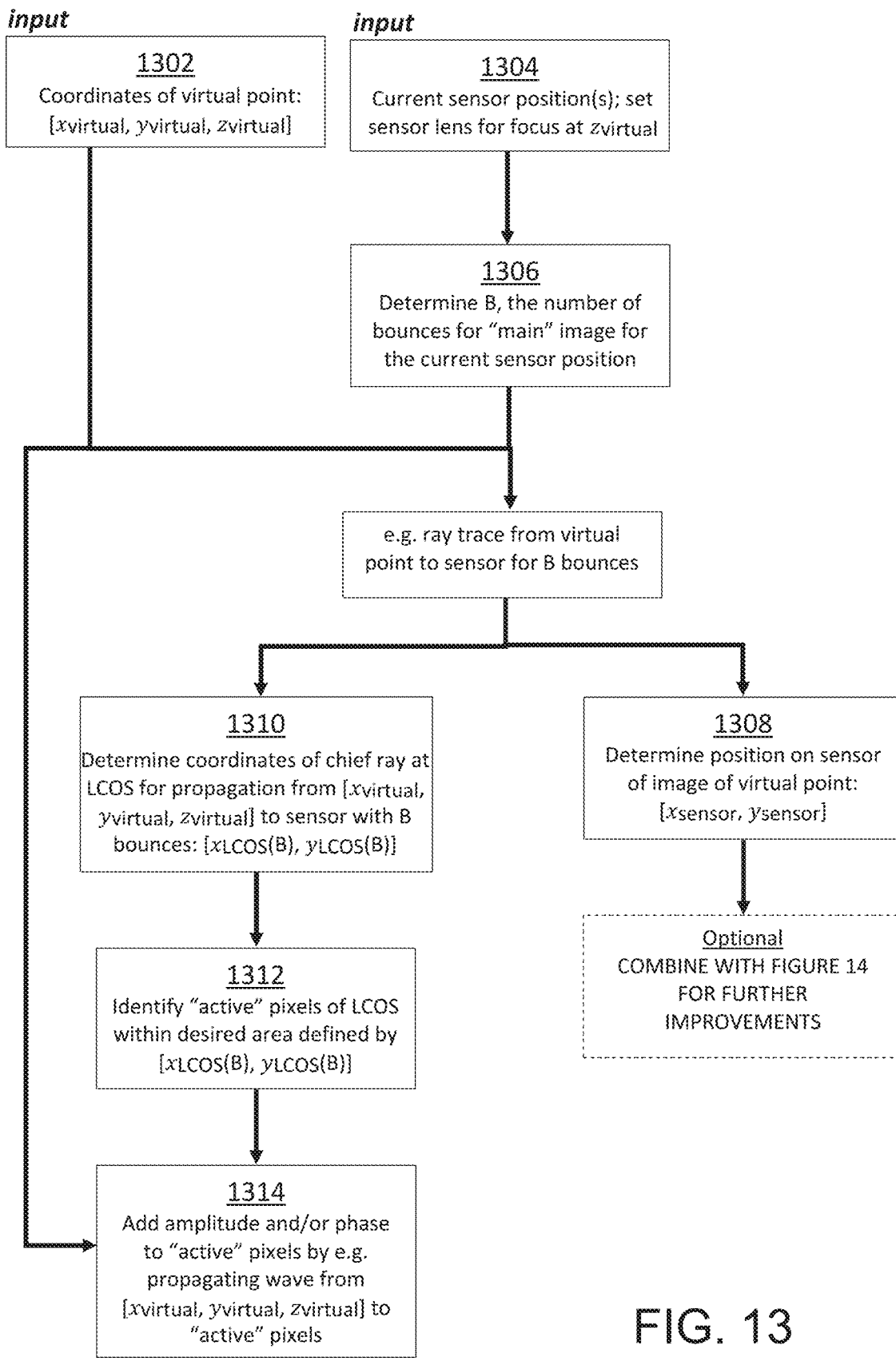
FIG. 13 shows a flow chart of an improved method to derive an improved data structure in accordance with embodiments.

FIG. 13 shows a method for determining the contributory and non-contributory areas of the display device, in accordance with a primary aspect of this disclosure. Optionally, these determinations can then be used to optimise generation of one or more holograms for display and illumination by a viewing system such as the system 1200 of FIGS. 12A and 12B. In the method described with reference to FIG. 13, the viewing system comprises a lens having an 'f'-number (i.e. focal length and aperture) and camera. The light-sensitive component of the camera may be, for example, a CCD array and is positioned on the viewing plane. Functionally, the lens and camera substitute the eye lens and retina of the human eye of a viewer and are solely used for the process of determining the contributory and non-contributory areas of the display device. These areas of the display device may be determined for a plurality of viewing positions (e.g. eye positions within a eye-motion box) and/or a plurality of image distances (e.g. virtual image distances in front of a vehicle). In some respects, the method disclosed with reference to FIG. 13 may be considered a precursor to hologram calculation. The method may be considered an optimisation or even a calibration process.

As will be well understood, each virtual image that is to be generated can be represented by one or more virtual image points, each with a corresponding location—for example, as defined by (x, y, z) coordinates. Steps one 1302 to six 1312 (detailed below) of the method 1300 of FIG. 13 may be applied separately to each virtual image point, within a virtual image that is to be created. Moreover, the method 1300 applies for a specific set of conditions—i.e., for particular measurements and constraints, of the viewing system. Therefore, any given iteration (or, 'run') of the method 1300 applies for building up a particular image that is to be created (virtual image point by virtual image point), and for when the system has a particular display-to-image distance 'z', a particular distance 'd' between the display device and the retina, a particular aperture (pupil) width, and a particular virtual image distance at which the eye is focussed An iteration of the method 1300 is also specific to a particular size and type of display device, and for a particular position of the eye, with a permitted viewing window. There may be other measurements and/or constraints, to which each iteration of the method is specific. According to embodiments, if any of those measurements or constraints change, the method 1300 may be re-run, to re-determine the contributory area(s) of the display device under the changed circumstances. It will be understood, however, that, according to embodiments, certain tolerances may be applied to one or more of those measurements or constraints, such that the method may not have to be re-run if they change by less than a predetermined amount and/or for less than predetermined length of time. The rules regarding when the method should be re-iterated may be determined on a per-system basis.

The method 1300 may be performed by a suitable processor. The processor may comprise, or be comprised within or in communication with, a hologram engine. The processor or hologram engine may be comprised within a light engine.

The processor may obtain or receive boundary information regarding the viewing system before the method 1300 is carried out. For example, it may obtain or receive information regarding the size of components such as the display device, information regarding the absolute and/or relative positions of various components and of the viewing system (e.g., potential human viewer), information regarding the light source, and so on.

According to the method 1300, in a first step 1302 the location—e.g., the coordinates [$x_{virtual}$, $y_{virtual}$, $z_{virtual}$] of the virtual image point (also referred to herein as the "virtual point" for shorthand) is obtained, in accordance with the location at which the virtual image is to be perceived. The virtual image distance between the lens 1209 and the virtual point is then obtained or determined. This virtual image distance may be set or determined by the processor that is performing the method 1300, or it may be set or determined by another entity, and communicated to that processor. It may be pre-set or selected from a plurality of possible virtual image distances, in some arrangements. In real-world operation, when the viewing system is an eye, eye-tracking or head-tracking information may be used in the determination of the virtual image distance.

In a second step 1304 the required distance 'A' between the lens and the sensor is determined for focus on the virtual image point. Each virtual image point can also be defined by an angle—see FIG. 4. Reference herein to "angular content" is made with respect to the virtual image points of the virtual image.

In a third step 1306, a number of reflections or bounces 'B' of light within the waveguide associated with a main or primary image formed by the viewing system is determined. The person skilled in the art of optics will appreciate that the waveguide generates a plurality of replicas of the light associated with the virtual image point and each replica may be associated with a different number of light bounces/reflections within the waveguide. By way of example only, one way to determine B is to determine the intersection of the chief ray with the display device for each possible light propagation path in the waveguide and select the number of reflections/bounces that puts the chief ray closest to the centre of the display device. Advantageously, this approach is such that the area of the display device contributing to the viewing system is largest.

Alternatively, another way of calculating the number of bounces to use in the third step 1306 comprises sub-steps 1 to 5 below:

1. Eye position known and used as input
2. Ray trace from the centre of the display device to the determined eye position for a first number of bounces, B. The extrapolation of that ray towards the virtual image defines an angle in the field of view ($\theta_B$) for this number of bounces (B).
3. Ray trace from the centre of the display device to the determined eye position for a second number of bounces, B+1. The extrapolation of that ray towards the virtual image defines an angle in the field of view ($\theta B+1$) for this number of bounces (B+1).
4. B is the number of bounces used for angular content between $\theta_B$ and $\theta_B+(\theta_{B+1}-\theta_B)/2$
5. B+1 is the number of bounces used for angular content between $\theta_B+(\theta_{B+1}-\theta_B)/2$ and $\theta_B$ The output from the first step 1302 (i.e., the coordinates of the virtual image point) and third step 1306 (the parameter, B) are used in a fourth step 1308 to determine the corresponding image position/point on the sensor [$x_{sensor}$, $y_{sensor}$, $z_{sensor}$]. That is, the fourth step 1308 determines the point on the sensor on which light of the virtual image point is received. In other words, the point on the sensor at which the virtual image point is imaged. This point on the sensor is referred to below, in relation to FIG. 14, as the main image point [$x_{sensor}$, $y_{sensor}$, $z_{sensor}$]. By way of example only, computational ray tracing from the virtual point to the sensor for B bounces within the waveguide may be used but the present disclosure is not limited to this approach to the fourth step.

The person skilled in the art will appreciate that a chief light ray (or simply chief ray) from the virtual point [$x_{virtual}$, $y_{virtual}$, $z_{virtual}$] to the point on the sensor [$x_{sensor}$, $y_{sensor}$, $z_{sensor}$] may be identified. Again, computational ray tracing may be used to identify or trace the chief ray but other methods are equally applicable. In a fifth step 1310, a display device intersection point [$x_{LCOS}(B)$, $y_{LCOS}(B)$, $z_{LCOS}(B)$] is identified, wherein the display device intersection point is the location on the display device at which the chief ray intersects the display device. The display device intersection point may be determined, calculated, or measured, for example by computational ray tracing.

In a sixth step 1312, an area of the display device associated with the display device intersection point [$x_{LCOS}(B)$, $y_{LCOS}(B)$, $z_{LCOS}(B)$] is identified. The area of the display device may be geometrically centred on this point [$x_{LCOS}(B)$, $y_{LCOS}(B)$, $z_{LCOS}(B)$]. For example, the area may be a circle or ellipse but other more complex shapes may be envisaged. If the area is a regular shape, such as a circle or ellipse, the radius of the area may be determined—for example, in accordance with the f-number of the lens of the viewing system. The area is referred to herein as a "primary contributory area" because it corresponds to a primary image formed by the viewing system. The word "contributory" reflects that the pixels of the display device within the identified area of the display device are the pixels that provide the necessary information content to the sensor. Other areas of the display device (i.e., other pixels of the display device) do not contribute to formation of the image point on the sensor. The other pixels may, of course, contribute to other image points on the sensor associated with other virtual image points.

The method in accordance with the primary aspect of the present disclosure ends with determination of the primary contributory area of the display device. Optionally, a hologram may be determined based on the primary contributory area—rather than on the entire area of the display device.

Accordingly, in an optional, seventh step 1314, a hologram component is determined for the primary contributory area based on the virtual point. Specifically, light parameters for the primary contributory area are determined. The light parameters may be amplitude and/or phase for each pixel of the primary contributory area. For example, a light amplitude and phase may be determined for each pixel within the primary contributory area based on the propagation of light from the virtual point to the primary contributory area using a point cloud method familiar to the person skilled in the art. The hologram component for the virtual point may be stored and combined with the hologram component for the other virtual points as part of the iterative process described in the following paragraph in order to build up a complete hologram for the entire virtual image.

In overview, the seventh step 1314, a light modulation value (e.g. an amplitude and/or phase value) is assigned to each pixel value of the display device within the primary contributory area. This is achieved by considering the propagation of a light wave from $[x_{virtual}, y_{virtual}, z_{virtual}]$ to the primary contributory area and adding the amplitude and/or phase to the pixels of the display device within the desired radius of $[x_{LCOS}(B), y_{LCOS}(B), z_{LCOS}(B)]$. That is, the amplitude and/or phase of light originating from the virtual image point and arriving at each point (i.e. pixel) of the primary contributory area is determined by considering the propagation of the light wave—that is, the amplitude and/or phase of the light wave after travelling the distance from the virtual image point to each pixel. This determination may be performed by any one of a number of different techniques known to the person skilled in the art of optics. This determination may be made by experimental measurement.

The first to seventh steps may be repeated for each virtual point, within a virtual image that is to be projected using the hologram. For example, the plurality of hologram components may be added together, to produce a resultant hologram for each pixel of the display device. For example, the complex amplitude may be added up at each pixel for propagation from all virtual image points. If the hologram is to be displayed on a phase-only modulator, the amplitude component of the resulting complex amplitude sum may be ignored, leaving only the phase. More broadly, this resultant is a diffractive structure corresponding to the virtual image which, if displayed and illuminated on the display device within the viewing system, forms the virtual image.

The hologram can be displayed or encoded on to the display device. As a result, the display device will be tuned to modulate light in a manner that enables the virtual image to be perceived by the viewer, at the required virtual image distance.

The method 1300 may be carried out substantially simultaneously (or in very quick succession) for each of a plurality of virtual points within a virtual image, so that a suitable hologram for the whole virtual image may be derived and encoded on to the display device very quickly, for a given viewing set up and for particular numerical measurements and constraints. If anything changes that might affect the identification of the contributory area(s), and/or the required tuning of the display device, the method may be re-run. The processor may be configured to re-run the method on a time-controlled loop, and/or in response to a signal indicating that a change has occurred, and/or when the content or identity of the required virtual image changes. The processor may include, or may be in communication with, a memory, for storing previously-calculated data. For example, a look up table or other storage means may be provided, which indicates the active area(s) of the display device, for a particular virtual image or virtual point, under a specific set of measurements and/or constraints.

The method 1300 may be run (or re-run) very quickly, in order to display a number of different virtual images in quick succession, and/or to respond accurately to changes in conditions such as movement of the user. Although only one eye is shown in the system of FIG. 12A, the method 1300 can be configured to consider both the viewer's eyes. Moreover, although certain of the descriptions above may refer to an aperture width, it will be appreciated that a pupil (and most other apertures, for viewing entities) is two dimensional and can change size in each of those two dimensions. The method 1300 may be configured to take two-dimensional aperture size, and changes thereto, into consideration.

The inventors found that a hologram of a virtual image could be efficiently determined using the method disclosed with reference to FIG. 13. However, the inventors also observed that in some cases only a relatively small portion of the LCOS was being utilised, when all areas of the LCOS that would conventionally propagate light that would form ghost images were not used. In a notable further technical advancement, the inventors found ways to use additional areas of the LCOS, in additional to the primary contributory area, and to calculate hologram values for those additional areas that would enable them to contribute light to reinforce the primary image, rather than forming unwanted ghost images.

As will be well understood, the optical path that a light ray takes through a waveguide in a viewing system may increase its path length, vis-à-vis the path lengths for respective other rays. Typically, such increases are likely to be small in comparison with the virtual image distance 'v', and so will not be visible to the eye.

Figure 14:
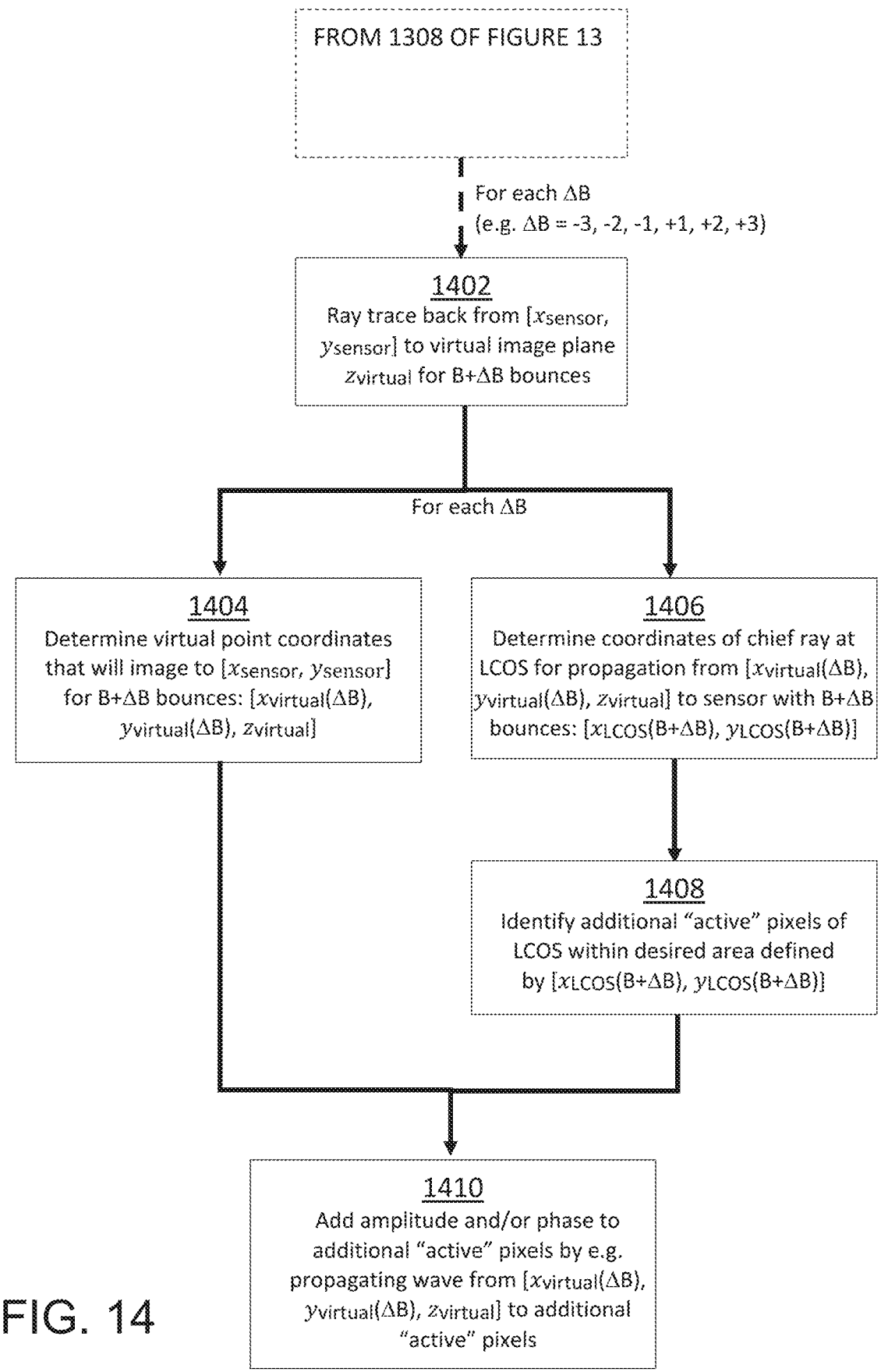
FIG. 14 shows a flow chart of a further improved method to derive an improved data structure in accordance with embodiments.

FIG. 14 shows a yet further improved method 1400, in accordance with additional recognitions made by the inventors, which can be applied for a system such as the system 1200 of FIGS. 12A and 12B. The method 1400 of FIG. 14 comprises all the steps of the method 1300 of FIG. 13 and, in addition, it comprises processing of one or more of the ghost image points, corresponding to the virtual point, which may also be present, and which conventionally would lead to the perception of one or more ghost images of the virtual image.

The method 1400 may be performed by a suitable processor. The processor may comprise, or be comprised within or in communication with, a hologram engine. The processor or hologram engine may be comprised within a light engine.

The processor may obtain or receive boundary information regarding the system before the method is carried out. For example, it may obtain or receive information regarding the size of components such as the display device, information regarding the absolute and/or relative positions of various components and of the viewer, information regarding the light source, and so on.

In some cases, the inventors have found that the ghost image points arise due to light, from the corresponding virtual point, travelling through a part of the display device that is different to the 'primary contributory area', through which the chief ray of the main image travels. In preceding Figures herein, such parts of the display device are referred to as being 'secondary contributory areas'. The light that creates one or more ghost image points, may be referred to as comprising one or more 'ghost rays'. The light rays giving rise to the ghost image may undergo a different number of bounces, within the waveguide, to those corresponding to the main image, in order to also travel through the narrow pupil of the viewer's eye and coincide with the retina. Therefore, if it is determined that the chief ray corresponding to the main image undergoes 'B' bounces within the waveguide, it may be determined that the light corresponding to a ghost image undergoes 'B+ΔB' bounces, where ΔB may be a negative or positive whole number, usually a single digit number, for example in the range from −5 to +5.

According to the improved method 1400 of FIG. 14, after the fourth step 1308 of the method 1300 of FIG. 13, in which the location of the main image point on the viewing plane is established—for example, its coordinates ($x_{sensor}$, $y_{sensor}$, $z_{sensor}$)—the subsequent steps of the method 13 of FIG. 13 may continue and, in addition, for example in parallel or at a later time, a further set of steps may be performed, as follows, for at least one value of ΔB. In summary, the improved method 1400 of FIG. 14 determines how many bounces 'B+ΔB' a ghost ray would have undergone, from the coordinates [$x_{virtual}$, $y_{virtual}$, $z_{virtual}$] of the virtual point, in order to form a ghost image point at the viewing plane. Then, the improved method 1400 determines a translated (or, amended) location of the virtual point, from which light could travel and undergo 'B+ΔB' bounces within the waveguide and arrive at the main image point on the viewing plane, rather than forming a separate ghost image point. A location on the LCOS, via which a light ray travels, from the translated location of the virtual point, to the main image point, may then be identified and may be encoded with a hologram, accordingly. Thus, one or more additional areas of the LCOS (other than the primary contributory area) may be encoded with hologram values to contribute to the main image, whilst still avoiding the creation of ghost images.

In more detail, the improved method 1400 is as follows:

In a first further step 1402, light rays from the main image point ($x_{sensor}$, $y_{sensor}$, $z_{sensor}$) are traced back to the virtual image, but for light rays that undergoes 'B+ΔB' bounces/reflections (rather than B bounces), within the waveguide.

In a second further step 1404, the location—e.g., the coordinates [$x_{virtual}(\Delta B)$, $y_{virtual}(\Delta B)$, $z_{virtual}(\Delta B)$]—are determined (e.g., as a result of the ray tracing that was performed at the first further step 1402), of a secondary virtual point of the virtual image that would image to the main image point [$x_{sensor}$, $y_{sensor}$, $z_{sensor}$]—i.e., that would propagate light that would travel through the display device, waveguide and entrance aperture to coincide with the viewing plane at the location [$x_{sensor}$, $y_{sensor}$, $z_{sensor}$]—if the light underwent 'B+ΔB' bounces. The term 'secondary virtual point' is used herein as shorthand for a secondary (i.e., a displaced, or amended) location of the (primary) virtual point. That is, the present inventors have recognised that, if the location of the virtual point was shifted to the 'secondary virtual point' location [$x_{virtual}(\Delta B)$, $y_{virtual}(\Delta B)$, $z_{virtual}(\Delta B)$], any light from the 'secondary virtual point' that underwent 'B+ΔB' bounces/reflections in the waveguide would contribute to the main image, at the viewing plane.

In summary, a third further step 1406 comprises determining the coordinates [$x_{LCOS}(B+\Delta B)$, $y_{LCOS}(B+\Delta B)$, $z_{LCOS}$] of a chief ray at the display device for light propagation from [$x_{virtual}(\Delta B)$, $y_{virtual}(\Delta B)$, $z_{virtual}$] to the viewing plane for B+DB bounces within the waveguide. In some cases, $z_{virtual}$ may be adjusted to take account of the different path length through the waveguide (i.e., because of the different number of bounces. This chief ray may be referred to as a 'secondary chief ray'.

In more detail, in the third further step 1406, a point on the display device is identified where the 'secondary chief ray' from the secondary virtual point to the main image point [$x_{sensor}$, $y_{sensor}$, $z_{sensor}$] would travel, undergoing B+ΔB bounces in the waveguide, via this point. This point on the display device has the coordinates [$x_{LCOS}(B+\Delta B)$, $y_{LCOS}(B+\Delta B)$, $z_{LCOS}$].

In a fourth additional step 1408, the point [$x_{LCOS}(B+\Delta B)$, $y_{LCOS}(B+\Delta B)$, $z_{LCOS}$] is assigned a radius or other suitable indicator of the extent, or size, of an area associated therewith. The area associated with the point [$x_{LCOS}(B+\Delta B)$, $y_{LCOS}(B+\Delta B)$, $z_{LCOS}$] is referred to herein as an "additional contributory area" because it propagates light that contributes to the main image point at the viewing plane, but only when that light originates from a displaced, or amended, location of the (primary) virtual point—i.e. [$x_{virtual}(\Delta B)$, $y_{virtual}(\Delta B)$, $z_{virtual}(\Delta B)$] not [$x_{virtual}$, $y_{virtual}$, $z_{virtual}$] as determined in the second further step 1404.

The fourth further step 1408 is similar to the sixth step 1312. Specifically, the fourth further step 1408 comprises identifying an area of the display device associated with the display device intersection point [$x_{LCOS}(B+\Delta B)$, $y_{LCOS}(B+\Delta B)$, $z_{LCOS}(B)$]. The area of the display device may be geometrically centred on this point [$x_{LCOS}(B+\Delta B)$, $y_{LCOS}(B+\Delta B)$, $z_{LCOS}(B)$]. For example, the area may be a circle or ellipse but other more complex shapes may be envisaged. If the area is a regular shape, such as a circle or ellipse, the radius of the area may be determined—for example, in accordance with the f-number of the lens of the viewing system. The area is referred to herein as an "additional contributory area" because it will propagate light contributing to the virtual image, if an appropriate hologram is calculated based on the displaced, or amended, location of the (primary) virtual point.

A fifth further step 1410 is similar to the seventh step 1314. The fifth further step 1410 is optional. In the fifth further step 1410, a hologram component is determined for the additional contributory area based on the amended location of the (primary) virtual point, [$x_{virtual}(\Delta B)$, $y_{virtual}(\Delta B)$, $z_{virtual}$]. Specifically, light parameters for the additional contributory area are determined. The light parameters may be amplitude and/or phase for each pixel of the additional contributory area. For example, a light amplitude and phase may be determined for each pixel within the additional contributory area based on the propagation of light from the different virtual point, [$x_{virtual}(\Delta B)$, $y_{virtual}(\Delta B)$, $z_{virtual}$], to the additional contributory area using a point cloud method familiar to the person skilled in the art. The hologram component for the different virtual point, [$x_{virtual}(\Delta B)$, $y_{virtual}(\Delta B)$, $z_{virtual}$], may be stored and combined with the hologram component for the other virtual points as part of the iterative described in the following paragraph in order to build up a complete hologram for the entire virtual image.

This required light modulation, by the display device, which is output in relation to a single individual virtual point, may be referred to as a "hologram component" for that virtual point. The hologram component may be stored, by the processor, during a subsequent repetition of the method 1300 for one or more other virtual points, within the virtual image that is to be created.

The steps 1402 to 1410 of the further improved method 1400 of FIG. 14 may, along with the steps one 1302 to seventh 1314 of the method 1300 of FIG. 13, be repeated for each virtual point, within a virtual image that is to be created. When the modulation behaviours, and corresponding hologram components, for each virtual point have been determined, the hologram components may be added together, to produce a resultant modulation behaviour for each pixel of the display device. This resultant modulation behaviour represents a diffractive structure, or hologram, for the virtual image, which, if displayed and illuminated on the display device within the viewing system, leads only to a main image being formed and does not form any ghost images. The main image that would be formed as a result of the improved method 1400 of FIG. 14 being carried out may be brighter than a corresponding main image resulting from the method 1300 of FIG. 13 alone.

The processor may output data corresponding to the hologram, in any suitable manner. The hologram can be encoded on to the display device. As a result, the display device will be tuned to modulate light in a manner that enables the virtual image to be perceived by the viewer, at the required virtual image distance, without the formation of any ghost images.

The method 1400 may be carried out substantially simultaneously (or in very quick succession) for each of a plurality of virtual points within a virtual image, so that a suitable hologram for the whole virtual image may be derived and encoded on to the display device very quickly, for a given viewing set up and for particular numerical measurements and constraints. If anything changes that might affect the identification and/or the required tuning of the display device, the method may be re-run. The processor may be configured to re-run the method on a time-controlled loop, and/or in response to a signal indicating that a change has occurred, and/or when the content or identity of the required virtual image changes. The processor may include, or may be in communication with, a memory, for storing previously-calculated data. For example, a look up table or other storage means may be provided, which indicates the active area(s) of the display device, for a particular virtual image or virtual point, under a specific set of measurements and/or constraints.

The method 1400 may be run (or re-run) very quickly, in order to display a number of different virtual images in quick succession, and/or to respond accurately to changes in conditions such as movement of the user. Although only one eye is shown in the system of FIG. 12A, the method 1400 can be configured to consider both the viewer's eyes. Moreover, although certain of the descriptions above may refer to an aperture width, it will be appreciated that a pupil (and most other apertures, for viewing entities) is two dimensional and can change size in each of those two dimensions. The method 1400 may be configured to take two-dimensional aperture size, and changes thereto, into consideration.

In accordance with a primary aspect of this disclosure, the inventors found that each virtual image point corresponds to a different primary contributory area on the display device. The inventors further recognised that this means that light from different parts of the virtual image (i.e., different virtual image points) follows different optical paths through the system. In an embodiment illustrated by FIGS. 15A and 15B, the inventors configured the system such that, in simple terms, (i) the virtual image comprises a plurality of discrete virtual image components or areas and (ii) light of each virtual image component is associated with a different number of bounces/reflections within the waveguide 1508.

Figure 15A:
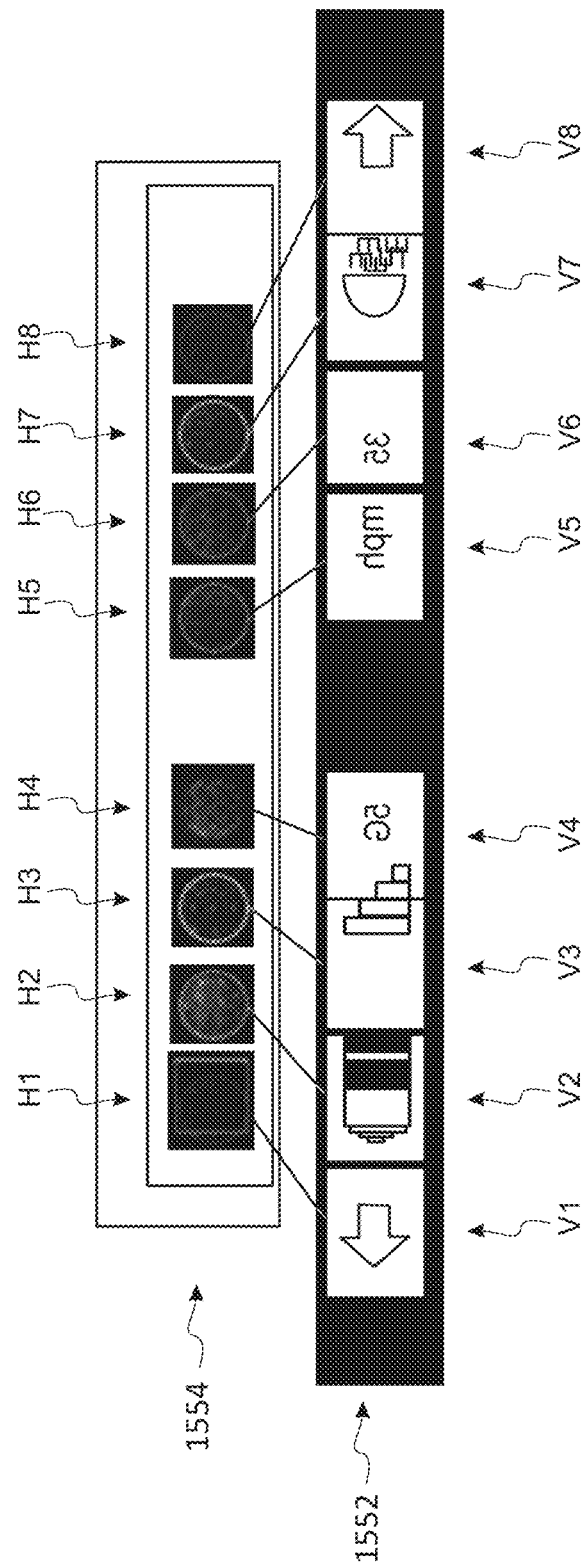
FIG. 15A shows an image comprising a plurality of image areas (bottom) and corresponding hologram comprising a plurality of hologram components (top)
Figure 15B:
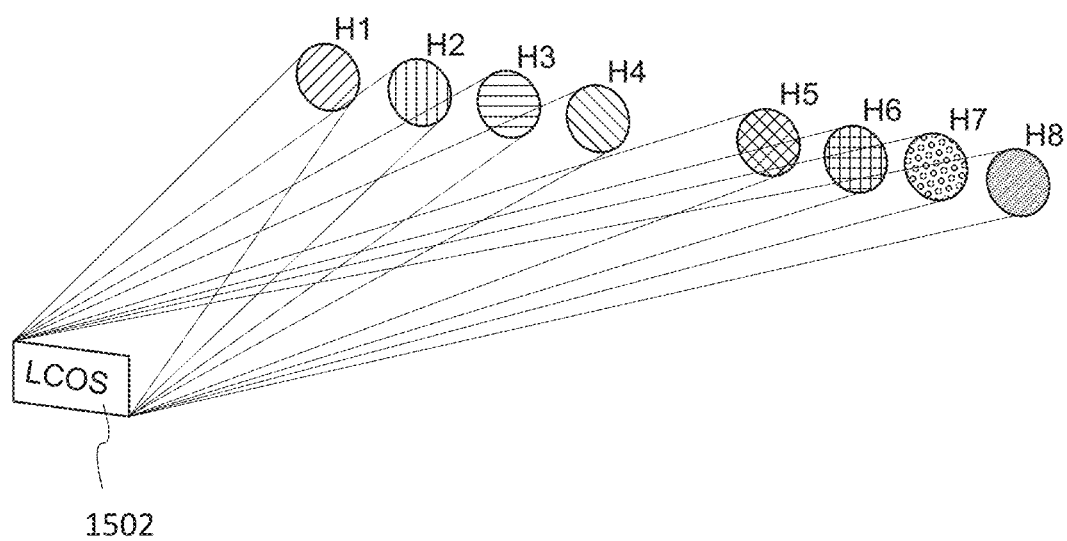
FIG. 15B shows a hologram, in accordance with the present disclosure, characterised by the routing or channelling of holographically encoded light into a plurality of discrete hologram channels.

FIG. 15A shows an image 1552 for projection comprising eight image areas/components, V1 to V8. FIG. 15A shows eight image components by way of example only and the image 1552 may be divided into any number of components. FIG. 15A also shows the encoded light pattern 1554 that can reconstruct the image 1552—e.g., when transformed by the lens of a suitable viewing system. The encoded light pattern 1554 comprises first to eighth sub-holograms or components, H1 to H8, corresponding to the first to eighth image components/areas, V1 to V8. FIG. 15A further shows how a hologram calculated in accordance with this disclosure effectively decomposes the image content by angle. The hologram may therefore be characterised by the channelling of light that it performs. This is illustrated in FIG. 15B. Specifically, the hologram in accordance with this disclosure directs light into a plurality of discrete areas. The discrete areas are discs in the example shown but other shapes are envisaged. The size and shape of the optimum disc may, after propagation through the waveguide, be related to the size and shape of the entrance pupil of the viewing system. This channelling of light only occurs due to the specific method of determining the hologram disclosed herein.

Figure 15C:
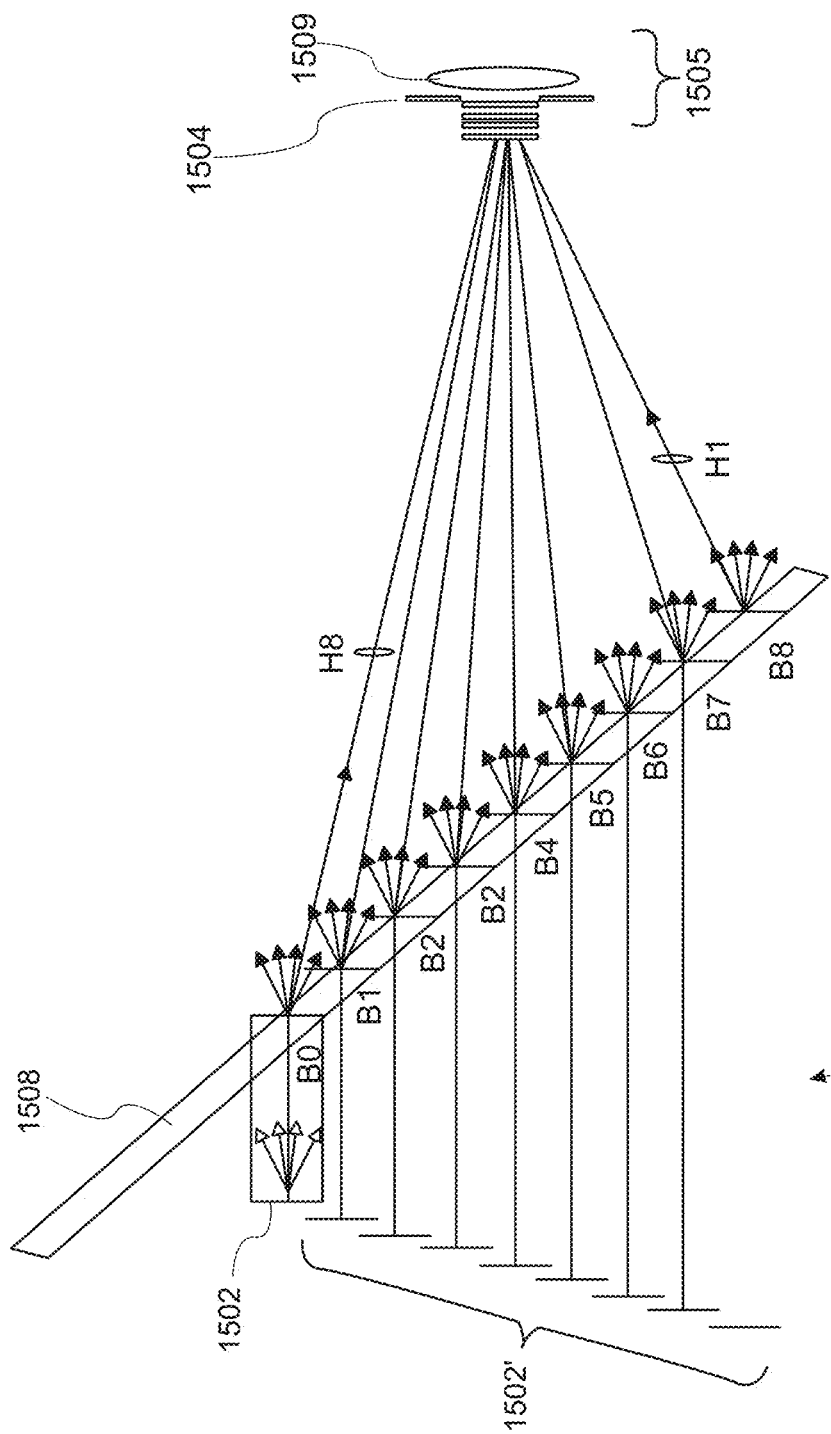
FIG. 15C shows an optimised system arranged to route the light content of each hologram channel through a different optical path to the eye.

FIG. 15C shows an improved viewing system 1500, in accordance with the recognitions illustrated in FIGS. 15A and 15B. The method 1300 of FIG. 13 or the method 1400 of FIG. 14 may be applied to the scheme illustrated by FIGS. 15A and 15B.

The viewing system 1500 comprises a display device, which in this arrangement comprises an LCOS 1502. The LCOS 1502 is arranged to display a modulation pattern (or 'diffractive pattern') comprising the hologram and to project light that has been holographically encoded towards an eye 1505 that comprises a pupil that acts as an aperture 1504, a lens 1509, and a retina (not shown) that acts as a viewing plane. There is a light source (not shown) arranged to illuminate the LCOS 1502. The lens 1509 of the eye 1505 performs a hologram to image transformation.

The viewing system 1500 further comprises a waveguide 1508 positioned between the LCOS 1502 and the eye 1505. The projection distance in FIG. 15C may be relatively large. However, as described in relation to previous Figures, the presence of the waveguide 1508 enables all angular content from the LCOS 1502 to be received by the eye 1505, even at this relatively large projection distance. This is because the waveguide 1508 acts as a pupil expander, in a manner that has been described hereabove.

Additionally, in this arrangement, when the LCOS 1502 has been encoded in accordance with the methods described herein, the waveguide 1508 can be oriented at an angle with respect to the LCOS 1502 in order to establish a unique relationship, between the light from the LCOS 1502 and the virtual image that the viewer will perceive. The size, location, and position of the waveguide 1508 are configured to ensure that light from each part of the virtual image enters the waveguide 1508 and is guided along its elongate axis, bouncing between the substantially planar surfaces of the waveguide 1508. Each time the light reaches the second planar surface (nearest the eye 1505), some light is transmitted and some light is reflected.

FIG. 15C shows a total of nine "bounce" points, B0 to B8, along the length of the waveguide 1502. The reader will notice that the centre of the image 1552 kept blank. FIG. 15C shows zeroth to ninth light "bounce" or reflection points, B0 to B8, within the waveguide. Although light relating to all points of the image (V1-V8) is transmitted out of the waveguide at each "bounce" from the second planar surface of the waveguide 1508, only the light from one of angular part of the image (e.g. light of one of V1 to V8) has a trajectory that enables it to reach the eye 1505, from each respective "bounce" point, B0 to B8. Moreover, light from a different angular part of the image, V1 to V8, reaches the eye 1505 from each respective "bounce" point. FIG. 15C shows light from all the different angular content being emitted at each "bounce" point, (depicted by a plurality of short arrows at each transmission point), but then only shows the optical path, to the eye 1505, of the respective angular content that will actually reach the eye 1505—and therefore will contribute to a respective portion of the virtual image that the viewer will perceive—from that respective part of the waveguide. For example, for the zeroth bounce, B0, the light that is transmitted by the waveguide 1508 is simply refracted and does not undergo any reflections therein. Light of the eighth sub-hologram, H8, reaches the eye from the zeroth bounce, B0. For the next bounce B1, the light that is transmitted by the waveguide 1502 undergoes one bounce therein, before transmission. Light from the seventh hologram, H7, reaches the eye from the next bounce, B1. This continues in sequence until the light that is transmitted by the waveguide 1508 at the final bounce, B8, has undergone eight bounces, before being transmitted and reaching the eye 1505, and comprises light encoded in accordance with the first hologram, H1.

In the example shown in FIG. 15, light of only one image area reaches the eye from each bounce point. A spatial correlation between areas of the virtual image and their associated bounce point on the waveguide is therefore established—when the hologram is determined as described herein. In some other examples, there may be relatively small overlaps such that one region of the image comes from two adjacent transmission points, and thus is comprised within two adjacent discs of light that propagate from the waveguide, towards the viewing plane.

Thus, the recognitions made by the inventors, and the methods and arrangements described herein, can enable a diffractive pattern (or, light modulation pattern) comprising a hologram to be generated that, when displayed on an LCOS or other suitable display device, can enable the light to be emitted therefrom effectively in a plurality of 'discs', or ray bundles of light, each of which corresponds to (more specifically, encodes) a different respective part of the corresponding virtual image.

Thus, improved methods and arrangements are described herein that enable holograms to be calculated, and to be displayed on a suitable display device, in a manner that enables clear images to be seen, by a viewer, when the display device is illuminated by a suitable light source. The images that the viewer sees can be free of ghosts and may be made brighter by the contribution of light, which would conventionally have contributed to a ghost image, instead contributing to the single main image.

The improved methods and arrangements described herein can be implemented in a variety of different applications and viewing systems. For example, they may be implemented in a head-up-display (HUD). In an improvement over many conventional HUDs, in which virtual images are formed, the improved methods and arrangements described herein can be implemented for creating virtual images at finite image distances—which can be selected and tuned by a suitable controller—whilst still eliminating ghost images.

Although virtual images, which require the eye to transform received modulated light in order to form a perceived image, have been discussed herein, the improved methods and arrangements described herein can be applied to real images.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode.

The system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A method of determining a hologram for display on a display device arranged to propagate spatially-modulated light to a viewing system, the method comprising:

(i) determining the location of an entrance pupil of the viewing system arranged to receive spatially-modulated light from the display device, the display device being arranged to propagate the spatially-modulated light to the viewing system through a waveguide pupil expander that is arranged to receive the spatially-modulated light from the display device and provide a plurality of different light propagation paths for the spatially-modulated light from the display device to the viewing system;

(ii) identifying at least one contributory area of the display device and at least one non-contributory area of the display device, wherein each contributory area of the display device is an area of the display device from which light propagating from the display device through the waveguide pupil expander pass through the entrance pupil of the viewing system at the determined location, each non-contributory area of the display device is an area of the display device from which light propagating from the display device through the waveguide pupil expander do not pass through the entrance pupil of the viewing system at the determined location;

(iii-a) identifying at least one primary contributory area of the display device that provides spatially modulated light contributing to a primary image received through the entrance pupil;

(iii-b) identifying at least one secondary contributory area of the display device that provides spatially modulated light contributing to a secondary image received through the entrance pupil, the secondary image being a lower-intensity replica of the primary image; and (iv) determining the hologram based on the at least one primary contributory area of the display device.

2. The method of determining a hologram as claimed in claim 1 wherein step (ii) is carried out by determining a contributory area for each virtual image point of a plurality of virtual image points of the primary image and for each virtual image point of a plurality of virtual image points of the secondary image, and wherein determining a location of each contributory area for each virtual image point of the primary image and each virtual image point of the secondary image comprises identifying a location at which a light ray, travelling from the respective virtual image point to the entrance pupil, intersects the display device.

3. A method of determining a hologram as claimed in claim 1 wherein the step (iii-a) comprises, for each virtual image point of a plurality of virtual image points of the primary image, determining a number of internal reflections, B, within the waveguide pupil expander corresponding to the primary image.

4. The method as claimed in claim 1 wherein each primary contributory area and each secondary contributory area has a size based on a diameter of the entrance pupil.

5. The method as claimed in claim 1 wherein steps (ii), (iii-a) and (iii-b) comprise for each virtual image point of a plurality of virtual image points of the primary image and for each virtual image point of a plurality of virtual image points of the secondary image:

ray tracing from the respective virtual image point having coordinates $[x_{virtual}, y_{virtual}, z_{virtual}]$ on a virtual image plane to a viewing plane of the viewing system for B light reflections within the waveguide pupil expander to identify a position $[x_{sensor}, y_{sensor}]$ on a viewing plane of the viewing system;

determining coordinates, $[x_{LCOS}(B), y_{LCOS}(B)]$, of a chief light ray at the display device for light propagation with B reflections from the image point $[x_{virtual}, y_{virtual}, z_{virtual}]$ to the position $[x_{sensor}, y_{sensor}]$ on the viewing plane; and identifying active pixels of the display device within an area defined by $[x_{LCOS}(B), y_{LCOS}(B)]$.

6. The method of determining a hologram as claimed in claim 5 further comprising, for one or more of the virtual image points of the primary image, identifying an additional primary contributory area of the display device associated with B+ΔB light reflections within the waveguide pupil expander, in which B+ΔB is a number of reflections different from B.

7. The method of determining a hologram as claimed in claim 6 wherein identifying the additional primary contributory area comprises for each of one or more points $[x_{sensor}, y_{sensor}]$ on the viewing plane:

ray tracing back from $[x_{sensor}, y_{sensor}]$ to the virtual image plane for B+ΔB light reflections within the waveguide pupil expander;

determining virtual image plane point coordinates, $[x_{virtual}(B+\Delta B), y_{virtual}(B+\Delta B), z_{virtual}]$, that will image to $[x_{sensor}, y_{sensor}]$ for B+ΔB reflections;

determining the coordinates, $[x_{LCOS}(B+\Delta B), y_{LCOS}(B+\Delta B)]$, of a chief light ray at the display device for light propagation from $[x_{virtual}(B+\Delta B), y_{virtual}(B+\Delta B), z_{virtual}]$ to the point $x_{sensor}, y_{sensor}]$ on the viewing plane with B+ΔB bounces; and identifying additional active pixels of the display device within a second area defined by $[x_{LCOS}(B+\Delta B), y_{LCOS}(B+\Delta B)]$.

8. The method of determining a hologram as claimed in claim 7, wherein step (iv) comprises determining, for each virtual image point of the plurality of virtual image points of the primary image, a first sub-hologram within the respective at least one primary contributory area determined with respect to B reflections in the waveguide pupil expander;

determining, for each virtual image point of the plurality of virtual image points of the primary image, a second sub-hologram within the respective at least one additional primary contributory area determined with respect to B+ΔB reflections in the waveguide pupil expander; and combining the first sub-holograms with the second sub-holograms to provide the hologram.

9. The method as claimed in claim 1 wherein step (iv) comprises determining one or more values for the hologram only in the at least one primary contributory area of the display device.

10. The method as claimed in claim 9 wherein step (iv) comprises excluding the at least one secondary contributory area during determination of the hologram.

11. The method as claimed in claim 1 wherein step (iv) comprises excluding values for the hologram in an area of the display device that is not comprised within the primary contributory area.

12. The method of determining a hologram as claimed in claim 1 wherein step (iv) comprises determining a sub-hologram within the respective at least one primary contributory area for each image point and combining the sub-holograms in order to form the hologram.

13. The method of determining a hologram as claimed in claim 12 wherein each sub-hologram comprises an amplitude and/or phase hologram component determined by propagating a light wave from [$x_{virtual}$, $y_{virtual}$, $z_{virtual}$] to the corresponding primary contributory area.

14. The method of determining a hologram as claimed in claim 1, wherein a hologram engine receives contribution information including the identifications of the primary contributory, secondary contributory and non-contributory areas of the display device; determines the hologram based on the primary contributory area; and outputs the hologram to the display device for display.

15. A method of image formation, the method comprising determining a hologram by the method as claimed in claim 1;

displaying the hologram on the display device;

spatially modulating light in accordance with the hologram;

propagating the spatially-modulated light from the display device, through the waveguide pupil expander and to the entrance pupil of the viewing system; and forming the primary image corresponding to the hologram from the spatially-modulated light at a viewing plane of the viewing system.

16. The method as claimed in claim 1 wherein step (iv) comprises excluding the at least one secondary contributory area during determination of the hologram.

17. The method as claimed in claim 1, wherein in step (iv) the hologram determination is limited solely to the at least one primary contributory area of the display device.

* * * * *